United States Patent
Bohringer et al.

(10) Patent No.: US 9,566,575 B2
(45) Date of Patent: Feb. 14, 2017

(54) ACTIVATED CARBON WITH A SPECIAL FINISHING, PRODUCTION AND USE THEREOF

(71) Applicants: Blucher Gmbh, Erkrath (DE); Technische Universitat Dresden, Dresden (DE)

(72) Inventors: Bertram Bohringer, Wuppertal (DE); Ilsebill Eckle, Gelsenkirchen (DE); Stefan Kaskel, Dresden (DE); Martin R. Lohe, Dresden (DE)

(73) Assignees: Blücher GmbH, Erkrath (DE); Technische Universität Dresden, Dresden (DE)

( * ) Notice: Subject to any disclaimer, the term of this patent is extended or adjusted under 35 U.S.C. 154(b) by 0 days.

(21) Appl. No.: 14/782,649

(22) PCT Filed: Mar. 11, 2014

(86) PCT No.: PCT/EP2014/054726
§ 371 (c)(1),
(2) Date: Oct. 6, 2015

(87) PCT Pub. No.: WO2014/161705
PCT Pub. Date: Oct. 9, 2014

(65) Prior Publication Data
US 2016/0038924 A1  Feb. 11, 2016

(30) Foreign Application Priority Data

Apr. 6, 2013 (DE) .................. 10 2013 005 717
Apr. 8, 2013 (DE) .................. 10 2013 005 851
May 28, 2013 (DE) .................. 10 2013 105 471

(51) Int. Cl.
| | | |
|---|---|---|
| *B01J 31/18* | (2006.01) |
| *B01J 31/16* | (2006.01) |
| *B01J 20/20* | (2006.01) |
| *B01J 21/18* | (2006.01) |
| *B01D 53/02* | (2006.01) |
| *B01D 53/86* | (2006.01) |

(Continued)

(52) U.S. Cl.
CPC ........ *B01J 31/1691* (2013.01); *A41D 31/0011* (2013.01); *B01D 53/02* (2013.01); *B01D 53/8687* (2013.01); *B01J 20/20* (2013.01); *B01J 20/226* (2013.01); *B01J 20/28004* (2013.01); *B01J 20/28019* (2013.01); *B01J 20/28057* (2013.01); *B01J 20/28064* (2013.01); *B01J 20/28066* (2013.01); *B01J 20/28069* (2013.01); *B01J 20/28073* (2013.01); *B01J 20/28076* (2013.01); *B01J 20/3078* (2013.01); *B01J 20/3204* (2013.01); *B01J 20/3236* (2013.01); *B01J 20/3265* (2013.01); *B01J 21/18* (2013.01); *B01J 23/72* (2013.01); *B01J 23/74* (2013.01); *B01J 35/1023* (2013.01); *B01J 35/1028* (2013.01); *B01J 35/1042* (2013.01); *B01J 35/1047* (2013.01); *B01J 37/0203* (2013.01); *B01J 37/0213* (2013.01); *B01J 37/04* (2013.01); *B01J 37/08* (2013.01); *B01D 2253/102* (2013.01); *B01D 2253/204* (2013.01); *B01D 2253/25* (2013.01); *B01D 2255/20761* (2013.01); *B01D 2255/702* (2013.01); *B01D 2255/705* (2013.01); *B01D 2257/304* (2013.01); *B01D 2257/406* (2013.01); *B01D 2257/702* (2013.01); *B01D 2257/90* (2013.01); *B01D 2257/93* (2013.01); *B01D 2259/4541* (2013.01); *B01D 2259/4583* (2013.01); *Y02C 10/08* (2013.01)

(58) Field of Classification Search
CPC ............... B01D 53/02; B01D 53/8687; B01D 2259/4583; B01D 2259/4541; B01D 2257/93; B01D 2257/90; B01D 2257/702; B01D 2253/204; B01D 2253/102; B01D 2253/25; B01D 2255/705; B01D 2255/20761; B01D 2255/702; B01D 2257/304; B01D 2257/406; B01J 31/1691; B01J 31/18; B01J 31/1845; B01J 20/3078; B01J 37/04; B01J 37/08; B01J 35/1042; B01J 35/1047; B01J 35/1023; B01J 35/1028; B01J 37/0213; B01J 20/3265; B01J 20/28064; B01J 20/28073; B01J 20/28019; B01J 20/28076; B01J 20/28066; B01J 23/74; B01J 37/0203; B01J 23/72; B01J 20/3204; B01J 20/28069; B01J 20/02
USPC ................ 502/171, 180, 182; 977/882, 883; 423/445 R, 460
See application file for complete search history.

(56) References Cited

U.S. PATENT DOCUMENTS

| | | | |
|---|---|---|---|
| 9,409,162 B2 * | 8/2016 | Bohringer | ............... B01D 39/06 |
| 9,440,219 B2 * | 9/2016 | Bohringer | ................ B01J 20/20 |

(Continued)

FOREIGN PATENT DOCUMENTS

EP      2 341 031 A1 *   7/2011   ............. C01B 31/00

*Primary Examiner* — Patricia L Hailey
(74) *Attorney, Agent, or Firm* — Edward E. Sowers; Brannon Sowers & Cracraft PC

(57) ABSTRACT

The invention relates to a method for producing activated carbon provided and/or impregnated with a metal-organic framework substance (MOF material), the activated carbon being in particular in the form of discrete activated carbon particles, and preferably for producing an activated carbon with a reactive and/or catalytic action. The metal-organic framework substance is produced in situ in the pores and/or in the pore system of the activated carbon, starting from at least one metal precursor compound (MP) containing a metal and at least one ligand precursor (LP).

21 Claims, No Drawings

(51) Int. Cl.
  *B01J 20/22*  (2006.01)
  *B01J 20/28*  (2006.01)
  *B01J 20/32*  (2006.01)
  *B01J 23/72*  (2006.01)
  *B01J 23/74*  (2006.01)
  *B01J 37/02*  (2006.01)
  *A41D 31/00*  (2006.01)
  *B01J 20/30*  (2006.01)
  *B01J 35/10*  (2006.01)
  *B01J 37/04*  (2006.01)
  *B01J 37/08*  (2006.01)

(56) References Cited

U.S. PATENT DOCUMENTS

| | | | |
|---|---|---|---|
| 2009/0263621 A1* | 10/2009 | Chang | B01D 53/28 |
| | | | 428/116 |
| 2011/0118490 A1* | 5/2011 | Hwang | C07F 11/005 |
| | | | 556/44 |
| 2012/0152845 A1* | 6/2012 | LeVan | B01D 53/02 |
| | | | 210/660 |
| 2014/0099571 A1* | 4/2014 | Proietti | H01M 4/8828 |
| | | | 429/527 |
| 2014/0284829 A1* | 9/2014 | Maspoch Comamala | B01J 31/16 |
| | | | 264/12 |
| 2015/0238930 A1* | 8/2015 | Said | B01J 20/226 |
| | | | 502/401 |
| 2016/0064773 A1* | 3/2016 | Choi | H01M 10/0565 |
| | | | 429/303 |

\* cited by examiner

ACTIVATED CARBON WITH A SPECIAL FINISHING, PRODUCTION AND USE THEREOF

CROSS-REFERENCES TO RELATED APPLICATIONS

This application is a National Stage filing of International Application PCT/EP 2014/054726, filed Mar. 11, 2014, claiming priority to German Applications No. DE 10 2013 005 717.5 filed Apr. 6, 2013, DE 10 2013 005 851.1 filed Apr. 8, 2013, and DE 10 2013 105 471.4 filed May 28, 2013, entitled "ACTIVATED CARBON WITH A SPECIAL FINISHING, PRODUCTION AND USE THEREOF". The subject application claims priority to PCT/EP 2014/054726, and to German Applications No. DE 10 2013 005 717.5, DE 10 2013 005 851.1 and DE 10 2013 105 471.4 and incorporates all by reference herein, in their entirety.

BACKGROUND OF THE INVENTION

The present invention relates to the technical field of adsorptive materials based on activated carbon which have some reactive/catalytic activity as well as adsorptive properties.

More particularly, the present invention relates to a process for producing an activated carbon having reactive/catalytic activity additization by endowing/impregnating the activated carbon with at least one metal-organic framework substance (MOF material).

The present invention further relates to an activated carbon having reactive/catalytic activity additization, obtainable by the process of the present invention, and also to a corresponding activated carbon as such.

The present invention further relates to uses of the activated carbon having catalytic/reactive activity/additization in the manufacture of filters and filter materials of any kind and also in the manufacture of protective materials of any kind. The present invention further relates to uses of the activated carbon according to the invention as a sorption store, as a catalyst/catalyst carrier and also for chemical catalysis and as gas sensor or in fuel cells. The present invention further relates to the uses of the activated carbon of the present invention for sorptive applications and/or for gas cleaning and also for gas purification and/or for the removal of noxiants. The present invention finally relates to the use of the activated carbon according to the invention for reprocessing/providing cleanroom atmospheres.

The present invention further relates to protective materials as such, obtained by using the activated carbon according to the invention and/or including the activated carbon according to the invention. The present invention further relates to filters/filter materials as such, obtained by using the activated carbon according to the invention and/or including the activated carbon of the present invention.

Chemical and biological noxiants/poisons and thus toxic substances based on organic and inorganic compounds/chemistries may occur in various forms in the built and/or natural environment and are an immense potential hazard to human life and health. The underlying chemical and biological noxiants/poisons may differ widely in origin:

For example, harmful or even toxic compounds are often by-produced in industrial processes as undesired secondary/waste products which, if improperly handled and, more particularly, if freely released into the environment, are a source of high danger and/or high toxic potential.

Chemical/biological noxiants/poisons are also employed as chemical/biological warfare agents, interchangeably also known as chemical warfare agents (CWAs). Warfare agents of this type continue to be part of the arsenal of many countries. In addition, owing to their in-principle ease of production and simplicity of transportation, warfare agents of this type represent a constant risk that they will also come into the possession of terrorist groups, so there is a permanent danger of misuse for that reason as well. The best-known warfare agents are, in particular, mustard gas, also known by the synonym of "HD", soman, sarin, phosgene and also tabun.

There are numerous prior art methods reportedly offering a basis for ensuring some protection against the above-adduced noxiants/poisons, in particular against toxic substances of industrial origin and also warfare agents. These include, for example, the employment of liquid/gas-impervious barrier materials processable in an appropriate manner, for example into protective suits. However, the materials employed for this are sometimes deficient in wearing comfort, since they prevent not only air but also water vapor transfer.

Adsorption materials, particularly in the form of activated carbon, are a further possibility for ensuring some protective function against chemical/biological noxiants/poisons. The adsorption material, in particular the activated carbon, may in this context be employed in the form of filters, for example on the basis of filters for NBC protective masks or the like. Employing adsorption materials of this type in protective suits is a further possibility, in which case the adsorption materials employed for this purpose are often fixed on a supporting structure. This makes it possible in principle to also realize air and water vapor pervious materials, which serves in particular to increase the wearing comfort of the protective suits manufactured on this basis—and this without significantly reducing the protective function.

Activated carbon has highly non-specific adsorptive properties—which ensures a protective function with regard to numerous chemical/biological noxiants/poisons of various types/characteristics—and a high adsorption capacity and so is the most widely used adsorbent in this context. Statutory requirements as well as increasing environmental awareness are leading to an increasing demand for activated carbon.

Activated carbon is generally obtained by carbonization (also known as pyrolysis) and subsequent activation of carbonaceous starting compounds, the preference being for starting compounds which lead to economically viable yields. This is because the weight losses caused by detachment of volatile constituents during carbonization and by the subsequent burn-out during activation are appreciable. For further details regarding the production of activated carbon in general, reference may be made for example to H. v. Kienle and E. Bäder, "Aktivkohle and ihre industrielle Anwendung", Enke Verlag Stuttgart, 1980.

The constitution of the activated carbon produced—whether finely or coarsely porous, firm or brittle, etc.—is also dependent on the starting material. Customary starting materials are coconut shells, charcoal and wood (e.g., waste wood), peat, bituminous coal, pitches, but also particular plastics, which play a certain part in the production of activated carbon cloths inter alia.

Various forms of activated carbon are used: carbon powder, splint coal and/or granulocarbon, molded carbon and also, since the end of the 1970s, activated carbon in spherical form ("spherocarbon"). Spherical activated carbon has a number of advantages over other forms of activated carbon, such as carbon powder, splint coal, granulocarbon, molded carbon and the like, making it valuable or even indispensable for certain applications: it is free-flowing, abrasion resistant, i.e. dustless, and hard. Spherocarbon, for example, is very much in demand for particular uses because of its specific shape, but also because of its high abrasion resistance.

Spherocarbon is currently still mostly produced in multi-step processes which are very costly and inconvenient. The best-known process consists in spherules being produced from coal tar pitch and suitable asphaltic residues from the petrochemical industry and oxidized (to render them unmeltable), and then carbonized and activated. For instance, spherocarbon is also obtainable in a multi-step process proceeding from bitumen. These multi-step processes are very cost-intensive, and the associated high price of the spherocarbon thus obtainable is a bar to many uses where spherocarbon actually ought to be preferred on account of its properties.

WO 98/07655 A1 describes a process for producing activated carbon spherules wherein a mixture comprising a distillation residue from diisocyanate production, a carbonaceous processing aid and optionally one or more further added substances is first processed into flowable spherules and subsequently the spherules thus obtained are carbonized and then activated.

The prior art further discloses the production of spherocarbon by carbonization and subsequent activation of virgin or spent ion exchangers containing sulfonic acid groups, or by carbonization of ion exchanger precursors in the presence of sulfuric acid with subsequent activation, wherein the sulfonic acid groups and the sulfuric acid, respectively, have the function of a crosslinker. Processes of this type are described for example in DE 43 28 219 A1, DE 43 04 026 A1 and also DE 196 00 237 A1 including the DE 196 25 069 A1 application for a German patent of addition.

The prior art further discloses processes wherein the production of activated carbon, in particular spherocarbon, is effected by carbonization and subsequent activation of sulfonated divinylbenzene-crosslinked polystyrenes (i.e., sulfonated styrene-divinylbenzene copolymers), cf. for example DE 10 2007 050 971 A1.

There are specific uses, however, where it is not just the geometry and/or outer shape of the activated carbon which is of decisive importance, but also its porosity, in particular the total pore volume and the adsorption capacity on the one hand and the distribution of the pores, i.e., the fraction of micro-, meso- and macropores in relation to the total pore volume, on the other. Especially the porosity can be intentionally varied through the choice of starting materials and also through the processing conditions. In the context of the present invention, the term "micropores" refers to pores having pore diameters of less than 2 nm, whereas the term "mesopores" refers to pores having pore diameters in the range from 2 nm (i.e., 2 nm inclusive) to 50 nm and the term "macropores" refers to pores having pore diameters of more than 50 nm (i.e. >50 nm).

Its good adsorptive properties help activated carbon into employment for a multiplicity of uses. For instance, activated carbon is employed for example in medicine or pharmacy, but also in the food industry. Activated carbon is also widely used for filter applications (e.g., filtration of gases and liquids, removal of unwanted or harmful/toxic gases, etc.).

Activated carbon is employable in particular in adsorption filter materials, including in particular specifically in protective materials against poisons, such as chemical-biological warfare agents, for example NBC protective apparel.

Air and water vapor pervious protective suits against chemical warfare agents are known for this purpose in particular; these air and water vapor pervious protective suits often have an adsorption filter layer comprising activated carbon to adsorb the chemical poisons.

There are disadvantages entailed by the use of porous adsorbents in the form of activated carbon in that, in particular, the capacity for adsorbing the chemical/biological noxiants/poisons in question is limited. This is because a specifically durable attachment of the adsorbed substances in the porous system of the activated carbon employed leads to a certain degree of saturation/exhaustion, limiting the uptake/adsorption of further noxiants. There is also a risk that the adsorbed noxiants/poisons will desorb again from the noxiant/poison-laden adsorbents and so will be released again.

On the other hand, activated carbon as such does not always have the ideal adsorption spectrum/bandwidth for the particular application, in particular with regard to the adsorption of inorganic chemistries/compounds, such as ammonia, hydrogen sulfide and hydrogen cyanide, or the like. Gas treatment and/or purification in particular requires adsorption materials having optimum adsorption capacities for inorganics as well as organics.

The prior art in this context discloses an addititization of activated carbon on the basis of so-called salt impregnations, in particular in the form of metal salts present as such in the activated carbon. More particularly, permeable adsorptive filtering systems, in particular permeable adsorptive filtering systems based on activated carbon, are often addititized with a catalyst to enhance the adsorptive performance/spectrum, in that this is reported to not only provide a certain degree of regenerability to the activated carbon but also to broaden the adsorption spectrum with regard to inorganic substances in particular.

An example of a specific impregnation employed in this context is a so-called ABEK impregnation, which has a catalytic effect with regard to specific toxic substances. In this context, type A relates to certain organic gases and vapors having a boiling point>65° C., for example cyclohexane. Type B relates to certain inorganic gases and vapors, for example hydrogen cyanide. Type E relates to a degrading/protecting effect with regard to sulfur dioxide and other acidic gases and vapors. Type K finally relates to a protective function with regard to ammonia and organic derivatives of ammonia. For further information, see the relevant European standard EN 14387 (January 2004).

The disadvantage with conventional impregnations of activated carbon is the fact that some of the adsorption capacity of the activated carbon, in particular with regard to organic compounds, is lost by the impregnation, which thus also reduces the adsorption and hence neutralization of chemical noxiants. The performance capability of the activated carbon is thus at times adversely affected by the impregnation processes known from the prior art.

In addition, a conventional addititization of activated carbon with a catalytic/reactive component does not always attain the desired efficacy. Particularly the problem of noxiants/poisons, in particular warfare agents, striking through at high concentrations is also not always solved by this principle; on the other hand, the desired efficiency is often not achieved at very low concentrations of to-be-removed noxiants or unwelcome gases (in the reprocessing of air for cleanroom conditions, for example), since effective adsorption only ensues at higher concentrations. Moreover, any conventional additization of activated carbon, in particular with metal salts, requires relatively large amounts of impregnant and, on the other hand, the desired homogeneous loading/additization of the adsorbents with the impregnating material is often not achieved in a satisfactory manner.

Against this background, approaches have been pursued in the prior art to provide adsorption materials having not only some reactive/catalytic activity but also improved adsorption properties with regard to inorganic toxic substances in particular.

EP 1 738 823 A2 in this context relates to a catalytically active unit comprising a supporting material, wherein the catalytically active unit or the supporting material comprises polymeric particles, wherein the polymeric particles include at least one catalytically active component, wherein organic-inorganic hybrid polymers in this regard, containing metals and/or heteroatoms in addition to silicon alkoxides and/or Si—O—Si units. The materials described, however, primarily act not as adsorbents but as catalytically active particles as such.

DE 10 2005 022 844 A1 describes a process for separating odorants from gases wherein a gas is said to be brought into contact with a filter which contains a porous metal-organic framework material, wherein the framework material includes at least one at least two-pronged organic compound bound coordinatively to a metal ion. Yet there are disadvantages in the occasionally costly and inconvenient production process and also the limited adsorption performance of the resulting adsorption material.

WO 2009/056184 A1 relates to a sorption filter material including an adsorbent based on a metal-organic framework substance and also, as a further adsorbent, a spatially separate sorbent based on activated carbon. The particles of the metal-organic framework substance on the one hand and also the particles based on activated carbon, on the other, may be fixed on a supporting material. The resulting sorption filter material, however, is not ideal with regard to its physical properties in particular, since particularly the particles based on the metal-organic framework material may have a lower stability and/or attritional hardness. In addition, the adsorption properties resulting from the separate arrangement of activated carbon on one side and of metal-organic framework substance on the other are not always ideal particularly under extremely high noxiant exposure in that adsorption properties across the area of the sorption filter material are sometimes not unitary with regard to organic and/or inorganic compounds.

BRIEF SUMMARY OF THE INVENTION

Against this background, therefore, it is an object of the present invention to provide an adsorption material in the form of activated carbon and a corresponding process for its production whereby the prior art disadvantages described above are at least substantially avoided and/or ameliorated.

It is a further object of the present invention to a specific process for targeted additization of activated carbon with a specific material to provide a reactive/catalytic activity/additization, which process shall as such be simple to handle and efficient and shall further lead to an activated carbon having altogether improved properties.

It is more particularly a further object of the present invention to provide an activated carbon having some reactive/catalytic activity in addition to excellent adsorptive properties and having altogether a broad adsorption spectrum with regard to the adsorption not only of organic but also inorganic noxiants/poisons in that the adsorption capacity shall at least essentially not be reduced by the underlying additization. More particularly, the activated carbon shall combine a high adsorption capacity with a very broad adsorption spectrum.

It is yet a further object of the present invention to provide an activated carbon suitable in particular for use in protective materials (such as protective suits, protective gloves, protective shoes and other protective apparel pieces and also protecting coverings, sleeping bags and the like) in that it ensures a high wearing comfort.

It is yet finally a further object of the present invention to provide an activated carbon suitable in particular for use in filters and filter materials (as for removal of noxiant, odorant and poisonous materials of any kind, in particular from air and/or gas streams, such as NBC protective mask filters, odor filters, sheet filters, air filters, in particular filters for indoor air cleaning, adsorption-capable supporting structures and filters for the medical sector) in that it ensures good filtering efficiency.

As the applicant company has now found in a completely surprising manner, the above-defined problem addressed by the present invention is unexpectedly solved when, in the context of the present invention, an activated carbon is in situ additized/endowed with a metal-organic framework substance (MOF material), by preparing/forming the metal-organic framework substance (MOF material) in the pores/porous system of the activated carbon in an intentional manner, so the activated carbon thus obtainable has by virtue of its modified inherent properties altogether improved adsorption properties including in particular with regard to the broadbandedness of the adsorption not only of organic but also of inorganic poisons/noxiants, plus catalytic/reactive properties, which also results in some self-regenerability on the part of the activated carbon, entailing longer periods of use/employment/deployment/service.

To solve the above-defined problem, therefore, the present invention—in a first aspect of the present invention—proposes the process for producing an activated carbon endowed/impregnated with at least one metal-organic framework substance (MOF material). Further, specifically advantageous incarnations of the process according to the present invention are subject matter of appendant process claims.

The present invention further provides—in a second aspect of the present invention—the activated carbon having reactive and/or catalytic additization, in particular in the form of discrete particles of activated carbon, as per the corresponding independent claim. Further, specifically advantageous incarnations of the activated carbon according to the present invention are subject matter of respective dependent claims.

The present invention further provides—in a third aspect of the present invention—the uses according to the present invention as defined in the independent use claim.

The present invention further provides—in a fourth aspect of the present invention—protective materials, in particular for the civilian or military sector, in particular protective apparel, as per the independent claim in this regard.

The present invention finally further provides—in a fifth aspect of the present invention—filters and filter materials, in particular for removal of noxiant, odorant and poisonous materials of any kind, as per the independent claim concerned.

It will be readily understood that, in the following description of the present invention, such incarnations, embodiments, advantages, examples or the like as are hereinbelow elaborated in respect of a single aspect of the invention only—for the avoidance of unnecessary repetition—shall of course also apply mutatis mutandis in relation to the other aspects of the invention without the need for any express mention.

It will further be readily understood that, in subsequent recitations of values, numbers and ranges, the respective values, numbers and range recitations are not to be construed as limiting; a person skilled in the art will appreciate that, in a particular case or for a particular use, departures from the recited ranges and/or particulars are possible without departing the realm of the present invention.

In addition, any hereinbelow recited values/parameter recitations or the like can in principle be determined/quantified using standardized or explicitly recited methods of determination or else using methods of determination and/or measurement which are per se familiar to a person skilled in the art.

As for the rest, it must be noted in relation to any hereinbelow recited relative/percentage particulars, in particular weight-based amounts, that these particulars must in the context of the present invention be selected and/or combined by a person skilled in the art such that the resulting sum total—including where applicable any further components/ingredients—always comes to 100% or for that matter 100 wt %. But this would be readily appreciated by a person skilled in the art.

Having made that clear, the present invention will now be more particularly described.

DETAILED DESCRIPTION OF THE INVENTION

In a first aspect of the present invention, the present invention provides a process for producing an activated carbon, particularly in the form of discrete particles of activated carbon, endowed and/or impregnated with at least one metal-organic framework substance (MOF material), preferably for producing an activated carbon having reactive and/or catalytic activity and/or additization, wherein the metal-organic framework substance is produced and/or formed in situ in the pores and/or the porous system of the activated carbon from at least one metal precursor (MP) compound, which contains at least one metal, and from at least one ligand precursor (LP).

The basic idea of the present invention is accordingly to provide a specific process which forms the basis for providing a very specific activated carbon having reactive/catalytic activity/additization in that the activated carbon is in effect additized with a metal-organic framework substance by preparing said metal-organic framework substance (MOF material) in the pores/porous system of the activated carbon and hence in the activated carbon itself.

The process of the present invention is therefore the basis for the metal-organic framework substance (MOF material) being formed, from specific precursor substances, in the porous system/pores of the activated carbon—on site and/or on the spot, as it were. This concept of the present invention ensures an effective and uniform additization of the porous system of the activated carbon with the metal-organic framework substance (MOF material), to further improve the adsorptive and also catalytic/reactive properties of the activated carbon.

As further detailed hereinbelow, the concept of the present invention provides for the underlying precursors based on the metal precursor (MP) compound on the one hand and the ligand precursor (LP) on the other to be first introduced into the porous system, for example on the basis of corresponding solutions and/or dispersions, and converted, with or without supply of energy, in particular thermal energy, into the metal-organic framework substance (MOF material), in particular by developing coordinative bonds particularly between the metal of the metal precursor (MP) compound and the ligand based on the ligand precursor (LP).

In the present invention, therefore, the activated carbon is additized with a metal-organic framework substance (MOF material) in a specific manner wherein, as noted, the metal-organic framework substance (MOF material) is formed at its destination itself, viz., inside the pores/porous system of the activated carbon. As hereinbelow described in detail, the importation of the metal precursor (MP) compound and of the ligand precursor (LP) is effected in this context on the basis of corresponding solutions/dispersions capable of infiltration into the porous system of the activated carbon, so the metal-organic framework substance (MOF material) can form thereafter, in particular in the course of a preferably thermal aftertreatment.

It is especially the inner porous system of the activated carbon which is endowed with the metal-organic framework substance (MOF material) in the process according to the invention.

Regarding as such the activated carbon obtainable by the process of the present invention, therefore, so-called metal-organic framework materials—interchangeably also referred to as "metal-organic framework substances", "metal-organic frameworks (MOFs)", "MOF substances", "MOF materials", "porous coordinative polymers" or the like—are employed, these generally having a porous configuration and a crystalline structure. These metal-organic framework materials have a relatively simple modular construction and form a new class of porous materials. In MOFs, there is generally a possibly multinuclear metal complex, in particular based on metal clusters, or at least one metal ion to act as a node linking to several multifunctional and/or multidentate ligands (known as linkers). The designation "metal-organic framework (MOF)" is due to Omar Yaghi, one of the pioneers in the field of metal-organic framework materials. Different compounds are named enumeratively after Yaghi, simply in line with their chronological discovery (in that, for instance, MOF-2 is from 1998 and MOF-177 is from 2004).

In the context of the present invention, the reference to metal-organic framework materials (MOF materials) is to be understood as meaning in particular the hybrid organic-inorganic polymer as obtained inside the porous system of the activated carbon and optionally freed of impurities which is constructed of structural repeat units based on optionally multinuclear metal complexes, in particular metal clusters, or metal ions on the one hand and bridging ligands on the other, wherein the ligands have in particular at least two functional groups and/or at least two coordination sites, i.e., are in particular at least bidentate (two-pronged). The metal-organic framework substances are thus constructed of optionally multinuclear metal complexes, in particular metal clusters, and/or metal ions, linked via at least two functional groups of the ligand and/or via at least bidentate (two-pronged) organic ligands so as to form a three-dimensional structure having internal voids (pores). These pores are in particular defined/determined by the metal atoms/metal clusters/metal ions and the type of connecting organic ligands. An MOF material may have exclusively identical multinuclear metal complexes or metal ions (that is, for example, exclusively copper or exclusively zinc etc.) or else alternatively two or more different types of multinuclear metal complexes or metal ions (i.e., different types, e.g., copper and zinc etc.).

For further details regarding metal-organic framework (MOF) substances, reference may be made for example to the review paper by S. Kaskel, "*Poren per Baukasten*" in: *Nachrichten aus der Chemie*, 53, April 2005, pages 394 to 399, and also to the literature referenced therein.

The synthesis of metal-organic framework substances as such is known in principle to a person skilled in the art, so no further observations are needed in this regard. Reference may be made in this context to the above-cited literature, in particular S. Kaskel (loc. cit.) and additionally also to the pertinent patent literature, illustratively and non-limitingly to WO 2007/023295 A2, US 2004/0097724 A1, WO 2005/049484 A1, WO 2005/068474 A1 and WO 2005/049892.

Metal-organic framework materials are thus porous, generally crystalline materials, in particular of well-ordered crystalline structure, which consist of metal-organic complexes between transition metals or multinuclear transition metal complexes (e.g., copper, zinc, nickel, cobalt, etc.) as nodes and organic molecules (ligands) as connectors/linkers between the nodes. Owing to their porosity, these materials have hitherto only been proposed for gas storage, for example for storage of hydrogen or methane. Similarly, their use as catalysts due to the large internal surface area (BET or Langmuir) at up to above 4500 $m^2/g$ has been considered, although as yet there are no concrete uses therefor whatsoever.

As a consequence of the pores/porous system, preferably the inner pores/porous system, of the activated carbon being additized with an MOF material in the manner of the present invention, the activated carbon thus modified is additionally endowed with catalytic/reactive properties. The concept of the present invention is in particular the basis for providing an activated carbon which, completely surprisingly, has a distinctly improved adsorption spectrum and in this context thus combines a high bandwidth for the adsorption with a high adsorption capacity. Without wishing to be tied to this theory the fact that the overall adsorption of the activated carbon is high despite the pores being additized with the MOF material can also be explained by the porous core structure of the MOF materials, which prevents occlusion or "plugging" of the pores and/or does itself lead to a certain degree of adsorption capability. More particularly, the activated carbon additized with the metal-organic framework substance has excellent adsorption properties in respect of inorganic as well as organic compounds. So the additization of the activated carbon with the metal-organic framework substance is also a basis for achieving excellent adsorption properties in respect of ammonia, hydrogen sulfide and hydrogen cyanide.

The invention thus provides an optimized adsorption system having combined and complementary adsorption properties entailed by some catalytic/chemical reactivity. More particularly, the activated carbon endowed with the MOF material in the manner of the present invention has complementary physisorption and chemisorption properties, so the activated carbon endowed with the metal-organic framework substance also displays self-regenerative properties due to the degradation of adsorbed noxiant/poisonous materials. Therefore, the protective function of the activated carbon endowed with the metal-organic framework material is ensured for a long period and, as noted, for a broad spectrum of noxiant/poisonous materials.

The defined molecular structure and/or spatial extent of the inorganic framework material formed in the pores of the activated carbon further serves to provide an activated carbon having defined and reproducible adsorption properties and thus a material of consistent quality. The additization of activated carbon with metal components in the form of the metal-organic framework material/substance of defined structure thus leads to an activated carbon of high capacity for organics and inorganics.

It must be emphasized in particular that the adsorption properties and the catalytic and/or reactive properties of the activated carbon thus endowed/modified are at least essentially independent of the ambient moisture/humidity and are thus generally moisture/humidity independent, while at the same time, as noted, enabling an at least essentially irreversible adsorption of noxiant/poison materials, so the activated carbon endowed with the metal-organic framework substance has but a minimal tendency to desorb previously adsorbed noxiant/poison materials.

By virtue of the distinctly improved adsorption properties entailed by a high adsorption capacity and broadness of adsorption, the present invention thus makes it possible to provide, altogether, gas treatment/purification filter materials having low weights, in particular low specific basis weights, and high air perviousness.

A further central advantage of the activated carbon endowed with the metal-organic framework substance by means of the process according to the present invention is that the physical properties of the activated carbon, in particular concerning the stability of the activated carbon, in particular in the form of its breaking strength or attritional hardness, are at least not essentially affected, so the materials provided are equally resistant to crushing and abrasion. Furthermore, the process of the invention is the basis for the invention providing an activated carbon combining the positive properties of an activated carbon as such and of an MOF material as such in one and the same material while at the same time ensuring that the MOF material remains permanently inside the activated carbon even under the influence of physical and/or chemical influences, since the MOF material is in a way protected inside the porous system of the activated carbon.

As far as the formation and/or presence of the metal-organic framework substance inside the activated carbon is concerned, it is advantageous in the present invention when the metal-organic framework substance (MOF material) is formed/present in the pores and/or porous system in at least partially crystalline form, preferably in crystalline form. More particularly, the metal-organic framework substance should be present/formed at least to some extent in corpuscular form and/or in particulate form, in particular in crystalline form, preferably in the form of crystallites, in the porous system of the activated carbon. The specific configuration of the MOF material in corpuscular form and/or in crystalline form leads to a high level of efficiency with regard to the reactive/catalytic properties and thus with regard to the decomposition/degradation of noxiant/poison materials. On the other hand, a high level of accessibility to the porous system of the activated carbon is simultaneously ensured for to-be-adsorbed noxiant/poison materials, so the adsorption capacity is not adversely affected to a significant degree at least. The adsorption capacity of the activated carbons obtainable in the context of the process according to the present invention is accordingly high even after additization with the metal-organic framework substance.

As noted, the metal-organic framework substance (MOF material) formed in the pores includes in particular structural repeat units each based on at least one metal, in particular metal atom or metal ion, or multinuclear metal complex, in particular metal cluster, which is preferably provided by the metal precursor (MP) compound, on the one hand, and at least one ligand, which is provided in particular by the ligand precursor (LP), on the other, wherein the ligand or ligand precursor (LP) includes in particular at least two functional groups and/or is in particular an at least bidentate (two-pronged) and/or bridging organic ligand and/or ligand precursor (LP).

The specific selection of the metal precursor (MP) compound on the one hand and of the ligand precursor (LP) on the other makes it possible to synthesize a huge multiplicity of various MOF materials in the pore system of the activated carbon, so the MOF material can be so to speak custom tailored against the background of the particular use/employment/deployment/service sector of the activated carbon additized/endowed therewith.

The metal and/or multinuclear metal complex may in principle be any metals and/or metal complexes of the periodic table that are capable of combining with at least one bifunctionalized and/or at least one two-pronged and/or bridging organic compound (ligand) to form a metal-organic porous framework material.

More particularly, the metal precursor (MP) compound should include at least one metal, in particular metal atom or metal ion, wherein the metal is selected from elements of groups Ia (group of the alkali metals), IIa (group of the alkaline earth metals), IIIa (scandium group), IVa (titanium group), Va (vanadium group), VIa (chromium group), VIIa (manganese group) and VIIIa (iron, cobalt, nickel group) and also Ib (copper group), IIb (zinc group), IIIb (boron group/earth metals), IVb (carbon-silicon group), Vb (nitrogen-phosphorus group) and VIb (chalcogens, oxygen group) of the periodic table (as per the former IUPAC nomenclature). The aforementioned groups correspond to groups 1 to 16 of the current IUPAC nomenclature.

More particularly, it is preferable in the context of the present invention for the metal, in particular metal atom or metal ion, of the metal precursor (MP) compound to be selected from the group of Mg, Ca, Sr, Ba, Sc, Y, Ti, Zr, Hf, V, Nb, Ta, Cr, Mo, W, Mn, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, Sb and Bi, preferably selected from the group of Zn, Cu, Ni, Pd, Pt, Ru, Fe, Mn, Ag, Al and Co, preferably selected from the group of Cu, Fe, Co, Zn, Mn, Al and Ag, more preferably selected from the group of Cu, Fe, Al and Zn.

More particularly, the metal of the metal precursor (MP) compound should comprise and/or consist of copper (Cu).

More particularly, the metal precursor (MP) compound employed in the context of the process according to the present invention may have a configuration such that it contains the metal in the form of the metal ion, and/or have a configuration such that the metal is in the form of the metal ion during the formation/synthesis of the MOF material. In this context, it is advantageous for the purposes of the present invention for the metal to be selected from the group of $Mg^{2+}$, $Ca^{2+}$, $Sr^{2+}$, $Ba^{2+}$, $Sc^{3+}$, $Y^{3+}$, $Ti^{4+}$, $Zr^{4+}$, $Hf^{4+}$, $V^{4+}$, $Nb^{3+}$, $Ta^{3+}$, $Cr^{3+}$, $Mo^{3+}$, $W^{3+}$, $Mn^{3+}$, $Mn^{2+}$, $Re^{3+}$, $Re^{2+}$, $Fe^{3+}$, $Fe^{2+}$, $Ru^{3+}$, $Ru^{2+}$, $Os^{3+}$, $Os^{2+}$, $Co^{3+}$, $Co^{2+}$, $Rh^{2+}$, $Rh^+$, $Ir^{2+}$, $Ir^+$, $Ni^{2+}$, $Ni^+$, $Pd^{2+}$, $Pd^+$, $Pt^{2+}$, $Pt^+$, $Cu^{2+}$, $Cu^+$, $Ag^+$, $Au^+$, $Zn^{2+}$, $Cd^{2+}$, $Hg^{2+}$, $Al^{3+}$, $Ga^{3+}$, $In^{3+}$, $Tl^{3+}$, $Si^{4+}$, $Si^{2+}$, $Ge^{4+}$, $Ge^{2+}$, $Sn^{4+}$, $Sn^{2+}$, $Pb^{2+}$, $As^{3+}$, $As^+$, $Sb^{5+}$, $Sb^{3+}$, $Sb^+$, $Bi^{5+}$, $Bi^{3+}$ and $Bi^+$. More particularly, the metal in the form of the metal ion may be $Cu^+$ and/or $Cu^{2+}$. As to further preferred metal ions, the above remarks regarding the metal atom as such can be referenced.

The present invention may provide in particular that the metal precursor (MP) compound is employed in the form of a specifically inorganic salt specifically of the underlying metal.

The metal precursor (MP) compound may in particular be selected from the group of halide salts, sulfates, sulfides, sulfites, nitrates, nitrites, nitrides, phosphates, phosphides, phosphites, carbamates, alcoholates, carbonates and bicarbonates, in particular carbonates and/or nitrates.

In one preferred embodiment of the present invention, the metal precursor (MP) compound may be employed in the form of a nitrate. In particular a copper salt, in particular a copper(II) salt, preferably copper nitrate, more preferably copper(II) nitrate ($Cu(NO_3)_2$) may be employed as metal precursor (MP) compound.

It is similarly preferable in the context of the present invention for the metal precursor (MP) compound to be employed in the form of a carbonate and/or bicarbonate, in particular carbonate. The metal precursor (MP) compound may moreover be employed in the form of copper carbonate and/or copper bicarbonate, in particular copper(II) carbonate ($CuCO_3$) and/or basic copper carbonate ($CuCO_3.Cu(OH)_2$)). More particularly, the use of the metal precursor (MP) compound in the form of specifically basic copper carbonate may form the basis for converting the metal precursor (MP) compound imported into the porous system of the activated carbon into oxidic copper compounds, such as copper(I) oxide ($Cu_2O$) and/or copper(II) oxide (CuO), in particular by the action of heat, in which case the oxidic compounds are so to speak formed in the porous system from the specifically basic copper carbonate and the formation of the MOF material takes place thereafter by admixture of the ligand precursor.

The present invention may accordingly also provide that the metal precursor (MP) compound is employed in the form of a hydroxide and/or oxide.

More particularly, the metal precursor (MP) compound may be employed in the form of a copper hydroxide, in particular in the form of copper(I) hydroxide ($Cu(OH)_2$).

More particularly, the metal precursor (MP) compound may be employed in the form of a copper oxide, in particular in the form of copper(I) oxide ($Cu_2O$) and/or copper(II) oxide (CuO).

As noted, the oxidic copper species are similarly obtainable in the pores/porous system by heat treatment from preferably basic copper carbonate in particular.

In general, the metal precursor (MP) compound is employable in the form of an organic salt in the present invention. The invention may similarly provide in this context that the metal precursor (MP) compound is employed in the form of a carboxylic acid salt, in particular in the form of a salt of an aliphatic saturated monocarboxylic acid. The carboxylic acid salt may be selected from the group of carbonates, acetates, propionates, butanoates, pentanoates, hexanoates and heptanoates, preferably carbonates, acetates and propionates, more preferably copper acetate ($CuAc_2$; Ac=acetate).

The ligand precursor (LP) employed according to the present invention should be employed herein particularly in the form of an at least bidentate (two-pronged) and/or bridging organic ligand precursor (LP).

According to the present invention, the ligand precursor (LP) should have at least one functional group, preferably at least two functional groups, capable of forming in respect of one metal, in particular metal atom or metal ion, at least two specifically coordinative bonds and/or in respect of two or more metals, in particular metal atoms or metal ions, the same or different, one specifically coordinative bond in each case.

In this context, the functional group of the ligand precursor (LP) should include at least one heteroatom, preferably from the group of N, O, S, B, P, Si and Al, more preferably N, O and S.

For example, the functional group of the ligand precursor (LP) may be selected from the group of $CO_2H$, $—CS_2H$, $—NO_2$, $—B(OH)_2$, $—SO_3H$, $—Si(OH)_3$, $—Ge(OH)_3$, $—Sn(OH)_3$, $—Si(SH)_3$, $—Ge(SH)_3$, $—Sn(SH)_3$, $—AsO_3H^-$, $—AsO_4H^{2-}$, $—P(SH)_3$, $—As(SH)_3$, $—CH(RSH)_2$, $—C(RSH)_3$, $—CH(RNH_2)_2$, $—C(RNH_2)_3$, $—CH\ R\ OH)_2$, $—C(ROH)_3$, $—CH(RCN)_2$, $—C(RCN)_3$, their salts and combinations, wherein the moiety R is selected from alkylene groups, in particular having 1 to 5 carbon atoms, or aryl groups, in particular having 1 or 2 aromatic nuclei.

More particularly, the functional group of the ligand precursor (LP) may also be selected from the group of $—CO_2^-$, $—SO_3^-$, $—PO_3^{2-}$, $—AsO_3^{2-}$, $—AsO_4^{2-}$ and combinations thereof.

In general, the above-recited functional groups also comprehend the charged/uncharged/ionic equivalents, for example in protonated/deprotonated form or the like.

The present invention may provide in particular that the functional group of the ligand precursor (LP) is in a state of attachment to an organic compound.

In this context, the organic compound should be selected from the group of saturated and unsaturated aliphatic compounds, aromatic compounds and aliphatic-aromatic compounds, in particular when the ligand precursor (LP) includes at least two functional groups.

In particular, the aliphatic compound or the aliphatic part of the aliphatic-aromatic compounds may be linear and/or branched and/or cyclic. In particular, the aliphatic compound or the aliphatic part of the aliphatic-aromatic compounds may include from 1 to 20, in particular from 1 to 15, preferably from 1 to 10, carbon atoms.

The present invention may further provide that the ligand precursor (LP) is selected from at least dibasic organic acids, in particular dicarboxylic acids, tricarboxylic acids, tetracarboxylic acids, their salts and combinations, more preferably unsubstituted or at least monosubstituted aromatic, in particular mono-, di-, tri-, tetra- or higher-nuclear aromatic, di-, tri- or tetracarboxylic acids, in particular wherein each of the aromatic nuclei contains at least one heteroatom, identical or different, in particular N, O, S, B, P, Si and/or Al, preferably N, S and/or O.

In one embodiment of the present invention, the ligand precursor (LP) may be selected from the group of (i) tetradentate carboxylic acids, in particular oxalic acid, malonic acid, succinic acid, glutaric acid, phthalic acid, isophthalic acid, terephthalic acid; (ii) hexadentate carboxylic acids, in particular citric acid, trimesic acid; and (iii) azoles, in particular triazole, pyrrodiazole; their salts and combinations; preferably hexadentate carboxylic acids, more preferably trimesic acid.

The ligand precursor (LP) may further be selected from heterocyclic, specifically nitrogenous, aromatic compounds. In particular, the ligand precursor (LP) may be selected from imidazole and/or bipyridine, in particular 2,2'-bipyridine and/or 4,4'-bipyridine.

As noted, the importation of the metal precursor (MP) compound on the one hand and of the ligand precursor (LP) on the other into the porous system of the activated carbon and/or the corresponding bringing into contact of the respective precursors results in the formation/creation of the MOF material particularly on the basis of a preferably thermal aftertreatment as hereinbelow described. In this aftertreatment, the metal precursor (MP) compound on the one hand and the ligand precursor (LP) on the other react to form the MOF material, in particular by development of coordinative bonds in particular between the metal, preferably metal atom or metal ion, or of the multinuclear metal complex, preferably metal cluster, of the metal precursor (MP) compound on the one hand and the ligand based on the ligand precursor (LP) on the other. For example, the process for producing an MOF material in the form of $Cu_3(BTC)_2$ in the manner of the present invention may employ, on the one hand, a copper-containing metal precursor (MP) compound, in particular in the form of copper nitrate ($Cu(NO_3)_2$), and, on the other hand, trimesic acid ($H_3BTC$) as ligand precursor (LP).

The activated carbon employed in the context of the process according to the present invention should further be formed of granular, preferably spherical activated carbon. The activated carbon should further be formed of granular, preferably spherical particles of activated carbon.

The particle sizes of the corresponding activated carbon particles may vary between wide limits. However, it is preferable for the purposes of the present invention when the activated carbon, in particular the particles of activated carbon, have corpuscle sizes, in particular corpuscle diameters, in the range from 0.001 mm to 3 mm, in particular in the range from 0.005 mm to 2.5 mm, preferably in the range from 0.01 mm to 2 mm, more preferably in the range from 0.02 mm to 1.5 mm, most preferably in the range from 0.05 mm to 1 mm. In addition, the activated carbon, in particular the particles of activated carbon, should have average corpuscle sizes, in particular average corpuscle diameters (D50), in the range from 0.01 mm to 2 mm, in particular in the range from 0.05 mm to 1.5 mm, preferably in the range from 0.1 mm to 1 mm. The corresponding corpuscle sizes are quantifiable in particular on the basis of the ASTM D2862-97/04 method.

In addition, the activated carbon should have a specific surface area (BET surface area) of at least 500 $m^2/g$, in particular at least 750 $m^2/g$, preferably at least 1000 $m^2/g$, more preferably at least 1200 $m^2/g$. In particular, the activated carbon should have a specific surface area (BET surface area) in the range from 500 $m^2/g$ to 4000 $m^2/g$, in particular in the range from 750 $m^2/g$ to 3000 $m^2/g$, preferably in the range from 900 $m^2/g$ to 2500 $m^2/g$, more preferably in the range from 950 $m^2/g$ to 2000 $m^2/g$.

The quantification of the specific surface area as per BET is known in principle to a person skilled in the art. Specified/reported BET surface areas all relate in particular to the quantification as per ASTM D6556-04. In the context of the present invention, the method employed for quantifying the BET surface area is in particular the so-called multipoint BET (MP-BET) method in a partial pressure region $p/p_0$ from 0.05 to 0.1.

The activated carbon should further have a bursting pressure of at least 5 newtons, in particular a bursting pressure in the range from 5 newtons to 50 newtons, per corpuscle and/or particle.

The activated carbon should further have an adsorption volume $V_{ads}$ of at least 250 $cm^3/g$, in particular at least 300 $cm^3/g$, preferably at least 350 $cm^3/g$, more preferably at least 400 $cm^3/g$. In particular, the activated carbon should have an adsorption volume $V_{ads}$ in the range from 250 $cm^3/g$ to 3000 $cm^3/g$, in particular in the range from 300 $cm^3/g$ to 2000 $cm^3/g$, preferably in the range from 350 $cm^3/g$ to 2500 $cm^3/g$. The adsorption volume $V_{ads}$ is well known to a person skilled in the art as a quantity to characterize the particulate adsorption materials employed. Methods of determination in this regard are also well known per se to a person skilled in the art. More particularly, the adsorption volume $V_{ads}$ is the weight-based adsorbed $N_2$ volume which is generally determined at a partial pressure $p/p_0$ of 0.995.

The activated carbon should further have a Gurvich total pore volume of at least 0.50 cm$^3$/g, in particular at least 0.55 cm$^3$/g, preferably at least 0.60 cm$^3$/g, more preferably at least 0.65 cm$^3$/g, most preferably at least 0.70 cm$^3$/g. In particular, the activated carbon should have a Gurvich total pore volume in the range from 0.50 cm$^3$/g to 2.0 cm$^3$/g, in particular in the range from 0.55 cm$^3$/g to 1.5 cm$^3$/g, preferably in the range from 0.60 cm$^3$/g to 1.2 cm$^3$/g, more preferably in the range from 0.65 cm$^3$/g to 1.0 cm$^3$/g.

The method for quantifying/measuring the Gurvich total pore volume is known per se to a person skilled in the art. For further details regarding the determination of the Gurvich total pore volume, reference may be made for example to L. Gurvich (1915), J. Phys. Chem. Soc. Russ. 47, 805, and also to S. Lowell et al., Characterization of Porous Solids and Powders: Surface Area Pore Size and Density, Kluwer Academic Publishers, Article Technologies Series, pages 111 ff.

In addition, the activated carbon may have a total porosity in the range from 10% to 80%, in particular in the range from 20% to 75%, preferably in the range from 25% to 70%, based on the corpuscle volume of the activated carbon.

The activated carbon should further have an abrasion resistance (ball pan hardness) of at least 90%, in particular at least 95%, preferably at least 97%, more preferably at least 98%, most preferably at least 99%. The abrasion resistance is determined in accordance with ASTM D3802-05 in particular. The high abrasion resistance leads to low attrition losses of the activated carbon in the course of the underlying transportation events in particular, which similarly lengthens the service life.

The activated carbon may further have a specific total pore volume in the range from 0.01 cm$^3$/g to 4.0 cm$^3$/g, in particular in the range from 0.1 cm$^3$/g to 3.0 cm$^3$/g, preferably in the range from 0.2 cm$^3$/g to 2.0 cm$^3$/g. In this context, the proportion of pores having pore diameters of ≤75 Å may be at least 65%, in particular at least 70%, preferably at least 75%. In particular, the activated carbon may have a proportion, based on the total pore volume, in particular on the Gurvich total pore volume, of micropores, in particular of micropores having pore diameters of ≤30 Å, in particular of ≤25 Å, preferably of ≤20 Å, of at least 30%, in particular at least 35%, preferably at least 45%, and/or in the range from 30% to 90%, in particular in the range from 35% to 85%, preferably in the range from 45% to 80%.

The micropore volume can be determined in particular as for carbon black. The carbon black method is known per se to a person skilled in the art, so no further details are required in this regard. In addition, regarding further details of determining the pore surface area and the pore volume by the carbon black method, reference may be made for example to R. W. Magee, Evaluation of the External Surface Area of Carbon Black by Nitrogen Adsorption, Presented at the Meeting of the Rubber Division of the American Chem. Soc., October 1994, as referenced for example in: Quantachrome Instruments, AUTOSORB-1, AS1 WinVersion 1.50, Operating Manual, OM, 05061, Quantachrome Instruments 2004, Florida, USA, pages 71 ff.

As far as the process according to the present invention is further concerned, it is provided in particular that the metal precursor (MP) compound and the ligand precursor (LP) are imported and/or deposited into the pores and/or the porous system of the activated carbon. In particular, the pores and/or the porous system of the activated carbon is endowed with the metal precursor (MP) compound and the ligand precursor (LP).

In this context, it has been found to be particularly advantageous for the metal precursor (MP) compound and/or the ligand precursor (LP) to be employed, conjointly or independently of each other, in the form of at least one aqueous, aqueous-alcoholic or alcoholic solution and/or dispersion, preferably in the form of an aqueous-alcoholic or alcoholic solution and/or dispersion. Employing the particular components in the form of at least one solution/dispersion provides a basis for particularly good deposition of the particular precursors into the porous system of the activated carbon, leading thereafter to uniform formation of and thus to uniform loading of the activated carbon with the metal-organic framework substance.

In a particular possible procedure adopted in the context of the present invention, the importation and/or deposition of the metal precursor (MP) compound and/or of the ligand precursor (LP), conjointly or independently of each other, into the pores and/or the porous system of the activated carbon is effected by drenching and/or infiltrating and/or impregnating the activated carbon with the at least one solution and/or dispersion of the metal precursor (MP) compound and/or of the ligand precursor (LP), preferably under application of shearing forces, more preferably under stirring. In the context of the present invention, therefore, it may be provided in particular that the activated carbon is brought into contact with the at least one solution and/or dispersion of the metal precursor (MP) compound and/or of the ligand precursor (LP), for example by dipping the activated carbon into the solution and/or dispersion, preferably under application of shearing forces, for example by stirring, and this is the basis for enabling said solution/dispersion to penetrate/infiltrate into the porous system with the particular precursor component.

As will be detailed hereinbelow, the particular precursor components, viz., the metal precursor (MP) compound and the ligand precursor (LP) are employable in the form of a conjoint solution and/or dispersion (which thus contains the metal precursor (MP) compound and the ligand precursor (LP)) or alternatively in the form of mutually different/distinct solutions/dispersions (in which case the particular solution and/or dispersion thus contains the metal precursor (MP) compound or the ligand precursor (LP)).

It is in principle also possible in the context of the present invention for the importation and/or deposition of the metal precursor (MP) compound and/or of the ligand precursor (LP) into the pores and/or porous system of the activated carbon to be effected conjointly or independently of each other via a gas phase loading and/or infiltration operation. To this end, the metal precursor (MP) compound and/or the ligand precursor (LP) are initially vaporized by heating in particular. The activated carbon to be modified is brought into contact with the corresponding gas phase and/or atmosphere and the deposition of the particular components into the pores/porous system of the activated carbon takes place via condensation/segregation.

In the context of the present invention, the importation and/or infiltration of the particular components may be effected continuously or alternatively batchwise, for example in the context of a continuous or batchwise infiltration.

As far as the importation/deposition of the precursor compounds is concerned, it has been found to be particularly advantageous for the purposes of the present invention when the procedure adopted in this regard is such that the metal precursor (MP) compound and the ligand precursor (LP), in particular the metal, in particular metal atom and/or metal ion, of the metal precursor (MP) compound and the ligand based on the ligand precursor (LP) and/or the ligand precursor (LP) as such are present in the pores/porous system in a corpuscle-based ratio [metal:ligand ratio] ranging from 10:1 to 1:5, in particular from 5:1 to 1:2, preferably from 4:1 to 1:1, more preferably from 3:1 to 1.25:1, yet more preferably about 3:2. The ratio should yet more preferably be about 3:2 because this corresponds to the stoichiometric ratio of the particular components in the resulting MOF material. The ratio in question can be established in particular by selecting the particular amount/concentration for the precursors in the solution(s) and/or dispersion(s) and/or by selecting the volumes used for the infiltration.

In a general embodiment of a possible procedure for the present process, the activated carbon and/or the at least one solution and/or dispersion of the metal precursor (MP) compound and/or of the ligand precursor (LP) has a temperature in the range from −80° C. to 50° C., in particular in the range from −60° C. to 30° C., preferably in the range from −50° C. to 20° C., in particular during the importation and/or deposition. This prevents premature formation of the MOF material and thus ensures an effective infiltration of the activated carbon with the particular solution/dispersion, so the subsequent formation of the MOF material in the pores of the activated carbon will proceed uniformly.

It has been found to be advantageous for the purposes of the present invention when the at least one solution and/or dispersion has a volume-based ratio of alcohol to water [alcohol:water ratio] in the range from 100:0 to 0:100, in particular in the range from 99:1 to 10:90, preferably in the range from 98:2 to 25:75, more preferably in the range from 95:5 to 50:50, yet more preferably in the range from 90:10 to 70:30. In particular, the alcohol should be employed in the form of ethanol. This ensures in particular good dissolution of the precursors in question, entailing improved infiltration of the activated carbon. The ratios recited above relate to the solvent as such, i.e., without admixture of the particular precursors.

In general, the solution and/or dispersion may contain the metal precursor (MP) compound in amounts ranging from 5 g/l to 2000 g/l, in particular from 10 g/l to 1750 g/l, preferably from 25 g/l to 1500 g/l, more preferably from 50 g/l to 1300 g/l. In particular, the solution and/or dispersion may contain the metal precursor (MP) compound in amounts ranging from 0.5 wt % to 75 wt %, in particular from 1 wt % to 65 wt %, preferably from 2.5 wt % to 60 wt %, more preferably from 5 wt % to 55 wt %, based on the solution and/or dispersion.

The solution and/or dispersion may also contain the ligand precursor (LP) in amounts ranging from 1 g/l to 500 g/l, in particular from 5 g/l to 400 g/l, preferably from 10 g/l to 300 g/l, more preferably from 20 g/l to 200 g/l. In addition, the solution and/or dispersion may contain the ligand precursor (LP) in amounts ranging from 0.1 wt % to 50 wt %, in particular from 0.5 wt % to 40 wt %, preferably from 1 wt % to 30 wt %, more preferably from 2 wt % to 20 wt %, based on the solution and/or dispersion.

It may additionally be provided in the context of the present invention that the importation and/or deposition of the metal precursor (MP) compound and/or the ligand precursor (LP) or the contacting of the activated carbon with the solution and/or dispersion is followed by performing at least one drying operation on the activated carbon, in particular to effect at least essentially complete removal of solvent and/or dispersant from the pores and/or porous system of the activated carbon. For example, the drying may be effected under application of negative pressure, in particular under vacuum. Similarly, the drying may be performed at temperatures in the range from 0° C. to 50° C., in particular in the range from 5° C. to 40° C., preferably in the range from 10° C. to 30° C., more preferably at about room temperature (T=20° C.)

The drying may be performed in particular when, in the course of infiltration, the porous volume of the activated carbon was completely filled with the particular solution and/or dispersion. Drying serves in particular to prevent solvent escaping with the particular precursors from the porous system in the course of the hereinbelow further described thermal aftertreatment, any escape leading to less preferable wetting of the surface of the activated carbon, entailing some product segregation outside the internal porous structure.

The drying may also be carried out, for example, in a gas stream (air or inert gas), under the above-recited temperatures in particular.

Further regarding the process of the present invention, especially after the activated carbon has been dried, renewed and/or repeated importation and/or deposition of the metal precursor (MP) compound and of the ligand precursor (LP) into the pores and/or porous system of the activated carbon may be carried out, in particular as described above. This makes it possible to increase the occupancy level/density of the particular precursors in the porous system of the activated carbon in a controlled manner.

The present invention may similarly provide in this context that the process step of importing/depositing the metal precursor (MP) compound and/or the ligand precursor (LP) with or without subsequent drying of the activated carbon is repeated. For instance, the importation/deposition of the particular precursors may thus be carried out independently of each other 1 time, 2 times, 3 times, 4 times, etc., in which case, as noted, a drying operation may be performed on the activated carbon between the particular depositing steps. In this context, as likewise noted, the deposition/importation is similarly effected in particular by bringing the activated carbon into contact with the at least one solution/dispersion of the precursors, in particular by immersion or the like, preferably under application of shearing forces, for example by stirring.

In general, the importation/deposition of the metal precursor (MP) compound and/or of the ligand precursor (LP) and/or optionally conducted drying of the activated carbon, preferably actually conducted drying of the activated carbon, are followed by at least one specifically thermal aftertreatment being carried out. The specifically thermal aftertreatment of the activated carbon preferably serves to convert/react the metal precursor (MP) compound, in particular the metal of the metal precursor (MP) compound, with the ligand precursor (LP) and/or the respective ligand constituent into the metal-organic framework substance (MOF material). The formation of the metal-organic framework substance preferably takes place by development of specifically coordinative bonds between the metal precursor (MP) compound, in particular the metal of the metal precursor (MP) compound, and the ligand precursor (LP).

The specifically thermal aftertreatment should be carried out at a temperature in the range from 10° C. to 500° C., in particular in the range from 20° C. to 400° C., preferably in the range from 50° C. to 300° C., more preferably in the range from 80° C. to 200° C.

In order to achieve good conversion of the precursor compounds/starting substances into the MOF material, the specifically thermal aftertreatment should be carried out for a time in the range from 1 h to 1200 h, in particular in the range from 5 h to 1000 h, preferably in the range from 10 h to 500 h, more preferably in the range from 20 h to 200 h. It is advantageous here for the thermal aftertreatment to be carried out under an at least essentially nonreactive, preferably at least essentially inert, atmosphere. In general, a possible procedure for this is to lengthen the specifically thermal aftertreatment inversely to the choice of treatment temperature, and vice versa.

As far as the process according to the present invention is concerned, the specifically thermal aftertreatment leads in particular to an effective conversion of the reactants based on the metal precursor (MP) compound on the one hand and the ligand precursor (LP) on the other in the pores/porous system of the activated carbon. A specifically thermal aftertreatment, in particular in repeated and/or multi-step infiltration of the precursor compounds and/or reactants, should be carried out without prior mixing of the reactants, using a single solution/dispersion. Without wishing to be tied to this theory, it is believed that the specifically thermal aftertreatment may give rise to a decomposition of the metal precursor compound with corresponding release of the metal/metal atom/metal ion/multinuclear metal complex. In the case of, for example, copper nitrate as metal source, the specifically thermal aftertreatment and/or conditioning may, at comparatively high temperatures in particular, give rise to an at least partial decomposition, in which case in particular the nitrate may be converted into nitrogen oxides, which should then be drawn off.

It is generally preferable in the present invention for the specifically thermal aftertreatment to be carried out at a comparatively low temperature for a comparatively long time. For example, the activated carbon may be aftertreated for about 24 hours at about 120° C., for a period of three to seven days at about 80° C. or alternatively for a period of three to four weeks at room temperature.

The process of the present invention may further comprise a wash and/or purification particularly of the as-obtained MOF-endowed activated carbon:

The present invention may provide in particular that the importation/deposition of the metal precursor (MP) compound and/or of the ligand precursor (LP) and/or optionally conducted drying of the activated carbon and/or optionally conducted specifically thermal aftertreatment of the activated carbon, preferably the specifically thermal aftertreatment of the activated carbon, are followed by at least one washing and/or purifying step on the activated carbon, in particular to remove unconverted metal precursor (MP) compound and/or in particular to remove unconverted ligand precursor (LP), being carried out. This wash/purification of the activated carbon may be effected using at least one washing/purifying agent.

In the preferred manner of the present invention, the wash/purification may be carried out with water and/or alcohol, in particular ethanol, as washing/purifying agent. More particularly, the wash/purification of the activated carbon may be followed by at least one further drying of the activated carbon, in particular as described above. As well as unconverted reactants, any waste products generated in the course of the specifically thermal aftertreatment may in particular also be removed from the porous system.

The wash/purification thus removes from the porous system of the activated carbon specifically unconverted reactants and also any waste products generated in the course of the formation of the MOF material, to prevent any blocking of the activated carbon pores and/or substrate pores. In addition, the procedure according to the present invention prevents any release/shedding of unconverted reactants and/or waste products from the porous system specifically under in-service conditions, for example due to the influence of any moisture and/or perspiration during the use of protective suits.

For comparatively small amounts of activated carbon endowed with the MOF material, in particular amounts having a bed volume up to about 500 ml, a so-called Soxhlet extraction specifically with ethanol can be carried out, for example, this being associated with minimal solvent consumption and hence with technical advantages. For comparatively large amounts of activated carbon endowed with the MOF material, for example amounts having a bed volume of 10 l or more, a two-step washing operation may be carried out in particular, in which case not only an alcoholic purifying agent, in particular ethanol, may preferably be used to dissolve out unconverted ligand precursor (LP) but also water, in particular to dissolve out unconverted metal precursor (MP) compound. More particularly, in this context, a first washing step is carried out with water as solvent, followed by a single to repeated washing step with alcohol, in particular ethanol. However, it is also possible to carry out the washing steps in the reverse order, i.e., first with alcohol and then with water.

It may further be provided in the context of the present invention that the activated carbon endowed with the MOF material be subjected to a specifically mechanical surface cleaning operation.

It may be provided more particularly in this context that the importation and/or deposition of the metal precursor (MP) compound and/or of the ligand precursor (LP) and/or optionally conducted drying of the activated carbon and/or optionally conducted specifically thermal aftertreatment of the activated carbon and/or optionally conducted washing, preferably optionally conducted washing and/or purification, are followed by a specifically mechanical surface cleaning of the activated carbon being carried out, in particular by the particles of activated carbon rubbing against each other, optionally followed by a further drying operation, in particular as described above.

In particular, the activated carbon obtained after the washing/purifying step may be initially freed of comparatively large amounts of solvent by dripping off, decanting off and/or sucking off. Surface drying of the activated carbon may be carried out thereafter, in particular in an air stream, preferably under inert gas conditions, in which case the particles of activated carbon will become fluidized and the individual particles rub against each other, causing surface cleaning to take place in this way. Any released dust and/or detached impurities may be removed and/or transported away by the air stream. Subsequent drying of the activated carbon thus surface cleaned may be effected for example under application of negative pressure, for example in a vacuum drying cabinet, at temperatures ranging from 50 to 150° C.

The process of the present invention may repeat the preceding steps, in particular the importation/deposition of the metal precursor (MP) compound and/or of the ligand precursor (LP), the drying of the activated carbon, the specifically thermal aftertreatment, the washing/purifying and also the specifically mechanical surface cleaning, in which case the steps may be repeated in the above-stated order, optionally with omission of individual steps and/or treatments, 1 time, 2 times, 3 times, 4 times, etc. In this way, overall, the occupancy level of MOF material in the porous system of the activated carbon and/or the pore fill fraction with the MOF material can be increased.

The present invention may further provide that an activation of the metal-organic framework substance (MOF material) is carried out in a further step. To this end, the activated carbon endowed with the metal-organic framework substance (MOF material) may be subjected to a heat/activation treatment. The heat/activation treatment may be carried out at temperatures below the decomposition temperature, in particular at temperatures in the range from 90° C. to 300° C., preferably in the range from 100° C. to 250° C., more preferably in the range from 110° C. to 220° C. The length of the heat/activation treatment may be in a range of 0.1 to 48 hours, in particular in the range from 1 to 30 hours, preferably in the range from 5 to 24 hours. In particular, the heat/activation treatment may be carried out under an at least essentially nonreactive, preferably at least essentially inert, atmosphere or alternatively in an oxidizing atmosphere.

Subjecting the activated carbon endowed with the MOF material to the subsequent heat/activation treatment, which is carried out in particular as the final operation following the above-recited treatment steps, may be used to confer particularly advantageous properties on the activated carbon obtained. This is because a specifically thermal activation of the MOF material formed in the porous system is believed to lead in general—without wishing to be tied to this theory—to an increase in the internal surface area and/or an optimized spatial configuration for the MOF material. The heat/activation treatment may either be carried out in an at least essentially nonreactive, preferably at least essentially inert, atmosphere or alternatively in an oxidizing atmosphere, for example in the presence of oxygen, for example under the ambient atmosphere. The heat/activation treatment serves to further improve the adsorption properties of the activated carbon thus treated. As noted, the heat/activation treatment may in particular be carried out as final treatment in the manufacture of MOF-endowed activated carbon.

Preferred embodiments of the process according to the present invention will now be described in detail:

The present invention may provide in particular that the treatment of the activated carbon to import/deposit the particular precursors is carried out with a conjoint solution/dispersion of the metal precursor (MP) compound on the one hand and of the ligand precursor (LP), i.e., by using one solution and/or dispersion containing the metal precursor (MP) compound and the ligand precursor (LP).

Therefore, in this embodiment, the solution and/or dispersion should contain the metal precursor (MP) compound and the ligand precursor (LP). In this context, the importation/deposition of the metal precursor (MP) compound and of the ligand precursor (LP) into the pores and/or porous system of the activated carbon may be effected by drenching and/or infiltrating and/or impregnating the activated carbon with the (conjoint) solution and/or dispersion of the metal precursor (MP) compound and of the ligand precursor (LP).

Further regarding the employment of a conjoint solution/dispersion of the particular precursor components, the solution and/or dispersion containing the metal precursor (MP) compound and the ligand precursor (LP) should contain the metal, in particular metal atom or metal ion, of the metal precursor (MP) compound and the ligand of the ligand precursor (LP) in a corpuscle-based ratio [metal:ligand ratio] in the range from 10:1 to 1:5, in particular in the range from 5:1 to 1:2, preferably in the range from 4:1 to 1:1, more preferably in the range from 3:1 to 1.25:1, yet more preferably in the range of about 3:2.

The solution/dispersion of the two precursors which is employed in this context thus contains all the components in one and the same solution/dispersion as are required for producing the metal-organic framework substance in the pores/porous system of the activated carbon. For example, an MOF material in the form of $Cu_3(BTC)_2$ is obtained for example by employing copper nitrate ($Cu(NO_3)_2$) as metal precursor (MP) compound and trimesic acid ($H_3BTC$) as ligand precursor (LP), which are for example dissolved/dispersed in aqueous, aqueous-alcoholic or alcoholic solution, preferably in ethanol or an alcohol-water mixture, preferably ethanol-water mixture.

In particular, the solution and/or dispersion containing the metal precursor (MP) compound and the ligand precursor (LP) is obtainable by a first solution and/or dispersion containing the metal precursor (MP) compound and a second solution and/or dispersion containing the ligand precursor (LP) being brought into contact, in particular by mixing and/or melding. The conjoint solution of the particular precursors is thus obtainable from respective individual solutions which each contain the metal precursor (MP) compound or the ligand precursor (LP), in particular by bringing the respective individual solutions/dispersions into contact, preferably by mixing, to obtain the conjoint solution and/or dispersion.

In relation to the use of a conjoint solution and/or dispersion, containing both the metal precursor (MP) compound and the ligand precursor (LP), a further embodiment of the present invention may proceed in the manner and/or on the basis of a room temperature process:

In this context and as far as the individual solutions optionally involved in providing the conjoint solution are concerned, the first solution and/or dispersion containing the metal precursor (MP) compound and the second solution and/or dispersion containing the ligand precursor (LP) independently may have a temperature in the range from 0° C. to 50° C., in particular in the range from 5° C. to 40° C., preferably in the range from 10° C. to 30° C., more preferably about room temperature (T=20° C.). In particular, the first solution and/or dispersion containing the metal precursor (MP) compound and the second solution and/or dispersion containing the ligand precursor (LP) may be independently prepared and/or combined/mixed to obtain the solution and/or dispersion containing the metal precursor (MP) compound and the ligand precursor (LP) at a temperature in the range from 0° C. to 50° C., in particular in the range from 5° C. to 40° C., preferably in the range from 10° C. to 30° C., more preferably about room temperature (T=20° C.)

In this context, the first solution and/or dispersion containing the metal precursor (MP) compound should contain the metal precursor (MP) compound in amounts ranging from 5 g/l to 500 g/l, in particular from 10 g/l to 300 g/l, preferably from 25 g/l to 200 g/l, more preferably from 50 g/l to 100 g/l. In particular, the first solution and/or dispersion containing the metal precursor (MP) compound should contain the metal precursor (MP) compound in amounts ranging from 0.5 wt % to 30 wt %, in particular from 1 wt % to 20 wt %, preferably from 2.5 wt % to 15 wt %, more preferably from 5 wt % to 10 wt %, based on the solution and/or dispersion.

In addition, the second solution and/or dispersion containing the ligand precursor (LP) should contain the ligand precursor (LP) in amounts ranging from 5 g/l to 500 g/l, in particular from 10 g/l to 300 g/l, preferably from 25 g/l to 200 g/l, more preferably from 30 g/l to 100 g/l. In particular, the solution and/or dispersion containing the ligand precursor (LP) should contain the ligand precursor (LP) in amounts ranging from 0.5 wt % to 30 wt %, in particular from 1 wt % to 20 wt %, preferably from 2.5 wt % to 15 wt %, more preferably from 3 wt % to 10 wt %, based on the solution and/or dispersion.

When the process of the present invention is conducted on the basis of the above-recited room temperature process, it is advantageous for the first solution and/or dispersion and/or the second solution and/or dispersion, independently of each other, to include an alcohol, in particular ethanol, as a solvent, and/or that an alcohol, in particular ethanol, is employed as a solvent in relation to the first solution and/or dispersion and also the second solution and/or dispersion, independently of each other.

When this embodiment of the present invention, based on the room temperature process, is practiced by using a conjoint solution and/or dispersion of the precursors and proceeding in particular from the respective individual solutions/dispersions, the procedure adopted should be in particular such that the conjoint solution and/or dispersion obtained by combining the individual solutions is brought into contact with the activated carbon and/or imported and/or deposited into the pores and/or porous system of the activated carbon immediately after or from 1 second to 60 seconds after, in particular from 1 second to 30 seconds after, preferably from 1 second to 10 seconds after, the first solution and/or dispersion containing the metal precursor (MP) compound and the second solution and/or dispersion containing the ligand precursor (LP) have been combined/brought into contact, in particular mixed and/or melded. As noted, this bringing into contact with activated carbon, in particular immersion of the to-be-treated activated carbon into the solution and/or dispersion in question, may preferably be effected by application of shearing forces, such as stirring.

When the process of the present invention is conducted on the basis of the above-recited room temperature process, therefore, a possible procedure in particular provides that the metal precursor (MP) compound, in particular copper nitrate, and the ligand precursor (LP), in particular trimesic acid, are dissolved in, for example, water in the case of copper nitrate and preferably in ethanol in the case of trimesic acid. The respective solutions/dispersions may then be united at room temperature in particular, in which case this is immediately followed by an infiltration of the activated carbon with the conjoint solution and/or dispersion thus obtained.

A significant advantage of employing a conjoint solution of the precursor components on the basis of the recited room temperature process is generally the simplicity of the procedure.

In a further preferred embodiment of the present invention, the process of the present invention may also be practiced as a so-called low-temperature process when a conjoint solution/dispersion of the precursors is used, as set out hereinbelow.

As far as any individual solutions involved in providing the conjoint solution are concerned, the first solution and/or dispersion containing the metal precursor (MP) compound and the second solution and/or dispersion containing the ligand precursor (LP) independently should have a temperature in the range from −80° C. to 0° C., in particular in the range from −60° C. to −5° C., preferably in the range from −40° C. to −10° C. In addition, the first solution and/or dispersion containing the metal precursor (MP) compound and the second solution and/or dispersion containing the ligand precursor (LP) should be independently prepared and/or combined/mixed to obtain the solution and/or dispersion containing the metal precursor (MP) compound and the ligand precursor (LP) at a temperature in the range from −80° C. to 0° C., in particular in the range from −60° C. to −5° C., preferably in the range from −40° C. to −10° C.

In this context, the first solution and/or dispersion containing the metal precursor (MP) compound should contain the metal precursor (MP) compound in amounts ranging from 10 g/l to 1500 g/l, in particular from 20 g/l to 1200 g/l, preferably from 50 g/l to 1100 g/l, more preferably from 100 g/l to 1000 g/l. In addition, the first solution and/or dispersion containing the metal precursor (MP) compound should contain the metal precursor (MP) compound in amounts ranging from 1 wt % to 60 wt %, in particular from 2 wt % to 50 wt %, preferably from 5 wt % to 45 wt %, more preferably from 10 wt % to 40 wt %, based on the solution and/or dispersion.

In addition, the second solution and/or dispersion containing the ligand precursor (LP) should contain the ligand precursor (LP) in amounts ranging from 10 g/l to 700 g/l, in particular from 15 g/l to 500 g/l, preferably from 30 g/l to 400 g/l, more preferably from 40 g/l to 200 g/l. Similarly, the solution and/or dispersion containing the ligand precursor (LP) should contain the ligand precursor (LP) in amounts ranging from 1 wt % to 40 wt %, in particular from 1.5 wt % to 30 wt %, preferably from 3 wt % to 25 wt %, more preferably from 4 wt % to 20 wt %, based on the solution and/or dispersion.

In a manner which is preferred according to the present invention, the particular solution and/or dispersion is obtained therein by using an alcohol, in particular ethanol, and/or by employing an alcohol-water mixture, in particular an ethanol-water mixture.

As regards the combining of the particular solutions and/or dispersions and the bringing of the resulting conjoint solution and/or dispersion into contact with the activated carbon are concerned, it has been found to be advantageous in the context of the present invention when the solution and/or dispersion containing the metal precursor (MP) compound and the ligand precursor (LP) is brought into contact with the activated carbon and/or imported and/or deposited into the pores and/or porous system of the activated carbon immediately after or from 1 second to 600 seconds after, in particular from 1 second to 300 seconds after, preferably from 1 second to 100 seconds after the first solution and/or dispersion containing the metal precursor (MP) compound and the second solution and/or dispersion containing the ligand precursor (LP) have been brought into contact, in particular mixed and/or melded.

The above-described procedure based on the low-temperature process may in summary be practiced altogether in an operation where the respective precursors/reactants, viz., the metal precursor (MP) compound, in particular copper nitrate, and the ligand precursor (LP), in particular trimesic acid, are first separately dissolved/dispersed in ethanol or an ethanol-water mixture, preferably for the purposes of the present invention an ethanol-water mixture having a volume ratio of 80:20 (ethanol/water ratio) is used. Before being combined/mixed, the respective solutions should be cooled down, in particular to the above-recited temperatures. Cooling down the corresponding solutions and/or the operation at low temperatures has the particular advantage that the conjoint solution/dispersion obtained from the respective individual solutions/dispersions and containing both the precursors is stable and employable for several hours. The preference of the invention is for mixing and processing temperatures for this in the range from −20° C. to −30° C.

In particular, the infiltration of the activated carbon with the conjoint solution/dispersion should be carried out before the corresponding solution and/or dispersion has warmed to any significant extent.

A central advantage to the procedure practiced in the manner of the present invention on the basis of a conjoint solution and/or dispersion in the context of the above-recited low-temperature process, therefore, is in particular that the pot lives are extended, which similarly entails technical advantages.

In a similarly preferred further embodiment of the process according to the present invention, the present invention also provides for the possibility of conducting a two-step treatment/importation of the precursor components into the porous system of the activated carbon on the basis of separate solutions, in particular by consecutively contacting the activated carbon with the respective solution and/or dispersion. In this embodiment, therefore, the precursors are imported on the basis of mutually distinct solutions and/or dispersions which each include either the metal precursor (MP) compound or the ligand precursor (LP).

In this context, therefore, the two-step procedure should employ the metal precursor (MP) compound and the ligand precursor (LP) in the form of mutually distinct and/or separate solutions and/or dispersions. In particular, a first solution and/or dispersion should contain the metal precursor (MP) compound and a second solution and/or dispersion should contain the ligand precursor (LP).

In this preferred embodiment of the process according to the present invention, the importation and/or deposition of the metal precursor (MP) compound and/or of the ligand precursor (LP) into the pores and/or porous system of the activated carbon should be effected by successively drenching and/or infiltrating and/or impregnating the activated carbon with the mutually distinct and/or separate solutions and/or dispersions of the metal precursor (MP) compound on the one hand and of the ligand precursor (LP) on the other. In this context, it has been found to be advantageous for the purposes of the present invention when an operation to dry the activated carbon, in particular as defined above, is carried out between the respective importation and/or deposition. In other words, this embodiment of the present invention is practiced by endowing the activated carbon first with the one precursor and then with the other precursor, in particular as described above, by contacting it successively with the respective solution and/or dispersion.

In one particular embodiment of the present invention, the metal precursor (MP) compound is imported and/or deposited into the pores and/or porous system of the activated carbon first, in particular by drenching and/or infiltrating and/or impregnating the activated carbon with the solution and/or dispersion containing the metal precursor (MP) compound, optionally followed by an operation to dry the activated carbon, in particular as defined above, wherein the ligand precursor (LP) is imported and/or deposited into the pores and/or porous system of the activated carbon thereafter, in particular by drenching and/or infiltrating and/or impregnating the activated carbon with the solution and/or dispersion containing the ligand precursor (LP).

In particular, the importation and/or deposition of the metal precursor (MP) compound into the pores and/or porous system of the activated carbon is followed by the reaction and/or conversion and/or decomposition of the metal precursor (MP) compound into a metal oxide. In this context, the reaction and/or conversion and/or decomposition should be carried out under an inert gas atmosphere and/or at a temperature in the range from 100° C. to 1000° C., in particular in the range from 150° C. to 950° C., preferably in the range from 200° C. to 920° C. This embodiment of the present invention makes possible precise generation in the porous system, as for example of metal oxides, which may as such constitute the metallic part of the resulting MOF material and/or are complexed as such by the ligands into the MOF material, in particular through formation of coordinative bonds.

In one possible embodiment of the present invention here, the metal precursor (MP) compound is selected from the group of copper nitrate ($Cu(NO_3)_2$) and basic copper compounds, in particular basic copper carbonate ($CuCO_3.Cu(OH)_2$).

In this case in particular, the reaction and/or conversion and/or decomposition of the metal precursor (MP) compound into the metal oxide may be carried out at a temperature of up to 400° C. and/or at a temperature in the range from 200° C. to 400° C. The metal oxide obtained in this regard is in particular at least one copper oxide, in particular copper(II) oxide (CuO).

Alternatively, the reaction and/or conversion and/or decomposition of the metal precursor (MP) compound into the metal oxide may be carried out at a temperature of more than 400° C. and/or at a temperature in the range from 400° C. to 920° C. The metal oxide obtained in this regard is in particular at least one copper oxide, in particular copper(I) oxide ($Cu_2O$).

In this embodiment of the present invention, therefore, the activated carbon is initially infiltrated with a metal source based on the metal precursor (MP) compound, preferably with a copper source, in which case this is for example preferably basic copper carbonate. The infiltration may then be followed by a thermal treatment, in particular hand in hand with an operation to dry the activated carbon, where mutually different species of copper may form as a function of the temperature. A comparatively high temperature, as noted, leads in particular to oxidic species of copper, such as copper(I) oxide and copper(II) oxide, and the resulting metal oxides are then complexed into the MOF material in the course of subsequent steps, in particular in connection with the subsequent additization of the activated carbon with the ligand precursor (LP). In this context, trimesic acid, preferably in the form of a solution and/or dispersion, in particular by using an ethanol-water mixture as solvent, may similarly be used as ligand precursor (LP) for example.

In a further embodiment of the process according to the present invention as per the two-step infiltration based on at least two different solutions and/or dispersions, a further possible procedure provides that the ligand precursor (LP) is imported and/or deposited into the pores and/or porous system of the activated carbon first, in particular by drenching and/or infiltrating and/or impregnating the activated carbon with the solution and/or dispersion containing the ligand precursor (LP), optionally followed by an operation to dry the activated carbon, in particular as defined above, wherein the metal precursor (MP) compound is imported and/or deposited into the pores and/or porous system of the activated carbon thereafter, in particular by drenching and/or infiltrating and/or impregnating the activated carbon with the solution and/or dispersion containing the metal precursor (MP) compound.

In the course of the two-step procedure, therefore, the respective precursors are dissolved/dispersed separately from each other and the respective solutions/dispersions are imported into the activated carbon separately from each other. Where, in the course of the first solution and/or dispersion, i.e., the first component, being imported, the porous volume of the activated carbon becomes at least essentially exhausted, an (intervening) drying step, in particular as described above, should be carried out before infiltration with the second solution/dispersion and/or component. It is advantageous in particular when initially the solution/dispersion of the ligand precursor (LP), in particular if in the form of trimesic acid, is infiltrated into the activated carbon system because, in general, the ligand precursor (LP), in particular in the form of trimesic acid, has a lower solubility as compared with the metal precursor (MP) compound, in particular in the form of copper nitrate. Where, in the subsequent second step, the infiltration is then effected with the solution of the metal precursor (MP) compound, in particular copper nitrate, a distinctly higher concentration can be used therefor, so the substrate or activated carbon does not have to be fully dried in the (intervening) drying step.

In particular, the volumes and/or concentrations of the solutions employed should be selected such that the metal precursor (MP) compound on the one hand and the ligand precursor (LP) on the other are present in the porous system in a corpuscle-based ratio [metal:ligand ratio] in the range from 10:1 to 1:5, in particular in the range from 5:1 to 1:2, preferably in the range from 4:1 to 1:1, more preferably in the range from 3:1 to 1.25:1, yet more preferably in the range of about 3:2.

In this context, it is advantageous for the two-step procedure of the present invention when the solution and/or dispersion containing the metal precursor (MP) compound contains the metal precursor (MP) compound in amounts ranging from 50 g/l to 2000 g/l, in particular from 100 g/l to 1750 g/l, preferably from 150 g/l to 1500 g/l, more preferably from 200 g/l to 1300 g/l. In particular, the solution and/or dispersion containing the metal precursor (MP) compound should contain the metal precursor (MP) compound in amounts ranging from 5 wt % to 75 wt %, in particular from 10 wt % to 65 wt %, preferably from 15 wt % to 60 wt %, more preferably from 20 wt % to 55 wt %, based on the solution and/or dispersion.

In this context, it is similarly advantageous for the purposes of the present invention when the solution and/or dispersion containing the ligand precursor (LP) contains the ligand precursor (LP) in amounts ranging from 10 g/l to 500 g/l, in particular from 20 g/l to 400 g/l, preferably from 40 g/l to 300 g/l, more preferably from 60 g/l to 200 g/l. In particular, the solution and/or dispersion containing the ligand precursor (LP) should contain the ligand precursor (LP) in amounts ranging from 1 wt % to 50 wt %, in particular from 2 wt % to 40 wt %, preferably from 4 wt % to 30 wt %, more preferably from 6 wt % to 20 wt %, based on the solution and/or dispersion.

The process of the present invention thus relates in general to the following embodiments in particular:

In particular, the present invention similarly provides a process for producing an activated carbon, particularly in the form of discrete particles of activated carbon, endowed and/or impregnated with at least one metal-organic framework substance (MOF material), preferably for producing an activated carbon having reactive and/or catalytic activity, as defined in the present invention, wherein the process comprises the following steps in the hereinbelow specified order (a) to (h):

(a) producing and/or providing at least one solution and/or dispersion, wherein the solution and/or dispersion contains at least one metal precursor (MP) compound, which contains at least one metal, and at least one ligand precursor (LP);

(b) importing and/or depositing the metal precursor (MP) compound and the ligand precursor (LP) into the pores and/or porous system of the activated carbon by contacting, in particular drenching and/or infiltrating and/or impregnating, the activated carbon with the solution and/or dispersion of the metal precursor (MP) compound and of the ligand precursor (LP);

(c) optionally drying the activated carbon, in particular to at least essentially completely remove solvent and/or dispersant from the pores and/or porous system of the activated carbon;

(d) optionally renewed performance of process step (b) and optionally (c);

(e) aftertreatment, in particular thermal aftertreatment, preferably to convert and/or react the metal precursor (MP) compound, in particular the metal of the metal precursor (MP) compound, with the ligand precursor (LP) into the metal-organic framework substance (MOF material), preferably by development of specifically coordinative bonds between the metal precursor (MP) compound, in particular the metal of the metal precursor (MP) compound, and the ligand precursor (LP), in particular wherein the metal-organic framework substance (MOF material) is produced in situ in the pores and/or porous system of the activated carbon from the metal precursor (MP) compound, which contains at least one metal, and the ligand precursor (LP);

(f) optionally washing and/or purifying the activated carbon, in particular to remove unconverted metal precursor (MP) compound and/or in particular to remove unconverted ligand precursor (LP);

(g) optionally specifically mechanical surface cleaning of the activated carbon, optionally followed by a further drying operation;

(h) optionally activating the metal-organic framework substance (MOF material), in particular wherein the activated carbon endowed with the metal-organic framework substance (MOF material) is subjected to a heat and/or activation treatment.

The present invention similarly provides a process for producing an activated carbon, particularly in the form of discrete particles of activated carbon, endowed and/or impregnated with at least one metal-organic framework substance (MOF material), preferably for producing an activated carbon having reactive and/or catalytic activity, as defined in the present invention, wherein the process comprises the following steps in the hereinbelow specified order (a) to (k):

(a) producing and/or providing at least one first solution and/or dispersion, wherein the first solution and/or dispersion contains at least one metal precursor (MP) compound, which contains at least one metal, and producing and/or providing at least one second solution and/or dispersion, wherein the second solution and/or dispersion contains at least one ligand precursor (LP);

(b) importing and/or depositing the metal precursor (MP) compound into the pores and/or porous system of the activated carbon by contacting, in particular drenching and/or infiltrating and/or impregnating, the activated carbon with the first solution and/or dispersion;

(c) optionally drying the activated carbon, in particular to at least essentially completely remove solvent and/or dispersant from the pores and/or porous system of the activated carbon;

(d) optionally renewed performance of process step (b) and optionally (c);

(e) importing and/or depositing the ligand precursor (LP) into the pores and/or porous system of the activated carbon by contacting, in particular drenching and/or infiltrating and/or impregnating, the activated carbon with the second solution and/or dispersion;

(f) optionally drying the activated carbon, in particular to at least essentially completely remove solvent and/or dispersant from the pores and/or porous system of the activated carbon;

(g) optionally renewed performance of process step (e) and optionally (f);

(h) aftertreatment, in particular thermal aftertreatment, preferably to convert and/or react the metal precursor (MP) compound, in particular the metal of the metal precursor (MP) compound, with the ligand precursor (LP) into the metal-organic framework substance (MOF material), preferably by development of specifically coordinative bonds between the metal precursor (MP) compound, in particular the metal of the metal precursor (MP) compound, and the ligand precursor (LP), in particular wherein the metal-organic framework substance (MOF material) is produced in situ in the pores and/or porous system of the activated carbon from the metal precursor (MP) compound, which contains at least one metal, and the ligand precursor (LP);

(i) optionally washing and/or purifying the activated carbon, in particular to remove unconverted metal precursor (MP) compound and/or in particular to remove unconverted ligand precursor (LP);

(j) optionally specifically mechanical surface cleaning of the activated carbon, optionally followed by a further drying operation;

(k) optionally activating the metal-organic framework substance (MOF material), in particular wherein the activated carbon endowed with the metal-organic framework substance (MOF material) is subjected to a heat and/or activation treatment.

The present invention additionally also provides a process for producing an activated carbon, particularly in the form of discrete particles of activated carbon, endowed and/or impregnated with at least one metal-organic framework substance (MOF material), preferably for producing an activated carbon having reactive and/or catalytic activity, as defined in the present invention, wherein the process comprises the following steps in the hereinbelow specified order (a) to (k):

(a) producing and/or providing at least one first solution and/or dispersion, wherein the first solution and/or dispersion contains at least one metal precursor (MP) compound, which contains at least one metal, and producing and/or providing at least one second solution and/or dispersion, wherein the second solution and/or dispersion contains at least one ligand precursor (LP);

(b) importing and/or depositing the ligand precursor (LP) into the pores and/or porous system of the activated carbon by contacting, in particular drenching and/or infiltrating and/or impregnating, the activated carbon with the second solution and/or dispersion;

(c) optionally drying the activated carbon, in particular to at least essentially completely remove solvent and/or dispersant from the pores and/or porous system of the activated carbon;

(d) optionally renewed performance of process step (b) and optionally (c);

(e) importing and/or depositing the metal precursor (MP) compound into the pores and/or porous system of the activated carbon by contacting, in particular drenching and/or infiltrating and/or impregnating, the activated carbon with the first solution and/or dispersion;

(f) optionally drying the activated carbon, in particular to at least essentially completely remove solvent and/or dispersant from the pores and/or porous system of the activated carbon;

(g) optionally renewed performance of process step (e) and optionally (f);

(h) aftertreatment, in particular thermal aftertreatment, preferably to convert and/or react the metal precursor (MP) compound, in particular the metal of the metal precursor (MP) compound, with the ligand precursor (LP) into the metal-organic framework substance (MOF material), preferably by development of specifically coordinative bonds between the metal precursor (MP) compound, in particular the metal of the metal precursor (MP) compound, and the ligand precursor (LP), in particular wherein the metal-organic framework substance (MOF material) is produced in situ in the pores and/or porous system of the activated carbon from the metal precursor (MP) compound, which contains at least one metal, and the ligand precursor (LP);

(i) optionally washing and/or purifying the activated carbon, in particular to remove unconverted metal precursor (MP) compound and/or in particular to remove unconverted ligand precursor (LP);

(j) optionally specifically mechanical surface cleaning of the activated carbon, optionally followed by a further drying operation;

(k) optionally activating the metal-organic framework substance (MOF material), in particular wherein the activated carbon endowed with the metal-organic framework substance (MOF material) is subjected to a heat and/or activation treatment.

The present invention further provides—in a second aspect of the present invention—an activated carbon having reactive and/or catalytic additization, in particular in the form of discrete particles of activated carbon, preferably activated carbon having reactive and/or catalytic activity, wherein the activated carbon is endowed and/or impregnated with at least one metal-organic framework substance (MOF material), wherein the activated carbon is obtainable as per the above-described process according to the present invention.

The present invention similarly provides an activated carbon having reactive and/or catalytic additization, in particular in the form of discrete particles of activated carbon, preferably activated carbon having reactive and/or catalytic activity, wherein the activated carbon is endowed and/or impregnated with at least one metal-organic framework substance (MOF material), wherein the activated carbon is obtainable by forming the metal-organic framework substance (MOF material) in situ in the pores and/or porous system of the activated carbon from at least one metal precursor (MP) compound, which contains at least one metal, and at least one ligand precursor (LP).

The present invention additionally provides an activated carbon having reactive and/or catalytic additization, in particular in the form of discrete particles of activated carbon, preferably activated carbon having reactive and/or catalytic activity, wherein the activated carbon is endowed and/or impregnated with at least one metal-organic framework substance (MOF material), wherein the metal-organic framework substance (MOF material) is present and/or arranged and/or formed in the pores and/or porous system of the activated carbon.

The present invention thus provides an activated carbon whose pores and/or porous system are endowed with a metal-organic framework substance in an intentional manner, which—completely surprisingly—leads to a significantly improved adsorption behavior, in particular also with regard to the broadbandedness of the adsorption not only of organic but also of inorganic compounds—and this at simultaneously high adsorption capacity. The present invention is thus the first to succeed in providing, on the basis of an activated carbon, an adsorption material which combines excellent adsorptive and also catalytic/reactive properties in one and the same material wherein the activated carbon of the present invention at the same time has excellent physical properties, in particular with regard to the stability of the adsorption material.

As far as the metal-organic framework substance in the pores/porous system of the activated carbon as such is concerned, the metal-organic framework substance (MOF material) includes in particular structural repeat units each based on at least one metal, in particular metal atom or metal ion, or one specifically multinuclear metal complex, in particular metal cluster, on the one hand and at least one organic ligand having at least two functional groups and/or at least bidentate (two-pronged) and/or bridging organic ligand on the other.

In general, in the activated carbon of the present invention, the metals, in particular metal atoms and/or metal ions, preferably metal atoms, recited above in connection with the metal precursor (MP) compound are linked by the linkers recited in connection with the ligand precursor (LP) to form MOF materials wherein the structure of the node and also the network topology of the MOF material is dependent on the coordination number of the respective metal ion and also on the type and number of the functional groups of the linker.

In this context, the MOF material is formable by the linking of metallic crosslink points (also known as nodes) which are formed in particular by metal ions or multinuclear metal complexes (metal clusters), with multifunctional ligands (also known as linkers). Depending on the nodes and linkers employed, therefore, one-, two- and three-dimensional networks are formable.

As noted, the metal of the resulting MOF material is provided, in particular, by the above-defined metal precursor (MP) compound.

In particular, the metal should be selected from elements of groups Ia, IIa, IIIa, IVa, Va, VIa, VIIa, VIIIa, Ib, IIb, IIIb, IVb, Vb and VIb of the periodic table. The above remarks regarding the process of the present invention may also be referenced in this regard.

In particular, the metal, in particular metal atom or metal ion, should be selected from the group of Mg, Ca, Sr, Ba, Sc, Y, Ti, Zr, Hf, V, Nb, Ta, Cr, Mo, W, Mn, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, Sb and Bi, preferably selected from the group of Zn, Cu, Ni, Pd, Pt, Ru, Fe, Mn, Ag, Al and Co, preferably selected from the group of Cu, Fe, Co, Zn, Mn, Al and Ag, more preferably selected from the group of Cu, Fe, Al and Zn. In particular, the metal should comprise or consist of Cu.

In particular, the metal, in particular metal ion, should be selected from the group of $Mg^{2+}$, $Ca^{2+}$, $Sr^{2+}$, $Ba^{2+}$, $Sc^{2+}$, $Y^{2+}$, $Ti^{4+}$, $Zr^{4+}$, $Hf^{4+}$, $V^{4+}$, $Nb^{2+}$, $Ta^{2+}$, $Cr^{2+}$, $Mo^{2+}$, $W^{2+}$, $Mn^{2+}$, $Mn^{2+}$, $Re^{2+}$, $Re^{2+}$, $Fe^{2+}$, $Fe^{2+}$, $Ru^{2+}$, $Ru^{2+}$, $Os^{2+}$, $Os^{2+}$, $Co^{2+}$, $Co^{2+}$, $Rh^{2+}$, $Rh^+$, $Ir^{2+}$, $Ni^{2+}$, $Nit$, $Pd^{2+}$, $Pd^+$, $Pt^{2+}$, $Pt^+$, $Cu^{2+}$, $Cu^+$, $Ag^+$, $Au^+$, $Zn^{2+}$, $Cd^{2+}$, $Hg^{2+}$, $Al^{2+}$, $Ga^{2+}$, $In^{2+}$, $Tl^{2+}$, $Si^{4+}$, $Si^{2+}$, $Ge^{4+}$, $Ge^{2+}$, $Sn^{4+}$, $Sn^{2+}$, $Pb^{2+}$, $As^{2+}$, $As^+$, $Sb^{5+}$, $Sb^{2+}$, $Sb^+$, $Bi^{5+}$, $Bi^{2+}$ and $Bi^+$.

The ligand should include at least one functional group capable of forming in respect of one metal, in particular metal atom or metal ion, at least two specifically coordinative bonds and/or in respect of two or more metals, in particular metal atoms or metal ions, the same or different, one specifically coordinative bond in each case.

In particular, the ligand is provided on the basis of the ligand precursor (LP).

The functional group of the ligand should further include at least one heteroatom, preferably from the group of N, O, S, B, P, Si and Al, more preferably N, O and S.

The functional group of the ligand should further be selected from the group of $CO_2H$, $-CS_2H$, $-NO_2$, $-B(OH)_2$, $-SO_3H$, $-Si(OH)_3$, $-Ge(OH)_3$, $-Sn(OH)_3$, $-Si(SH)_3$, $-Ge(SH)_3$, $-Sn(SH)_3$, $-PO_3H^-$, $-AsO_3H^-$, $-AsO_4H^{2-}$, $-P(SH)$ 3, $-As(SH)_3$, $-CH(RSH)_2$, $-C(RSH)_3$, $-CH(RNH_2)_2$, $-C(RNH_2)_3$, $-CH(R\ OH)_2$, $-C(ROH)_3$, $-CH(RCN)_2$, $-C(RCN)_3$, their salts and combinations, wherein the moiety R is selected from alkylene groups, in particular having 1 to 5 carbon atoms, or aryl groups, in particular having 1 or 2 aromatic nuclei.

The functional group of the ligand can finally also be selected from the group of $-CO_2^-$, $-SO_3^-$, $-PO_3^{2-}$, $-AsO_3^{2-}$, $-AsO_4^{2-}$ and combinations thereof.

In particular, the functional group of the ligand may be in a state of attachment to an organic compound. In this context, the organic compound may be selected from the group of saturated and unsaturated aliphatic compounds, aromatic compounds and aliphatic-aromatic compounds, in particular when the ligand includes at least two functional groups. In particular, the aliphatic compound or the aliphatic part of the aliphatic-aromatic compounds may be linear and/or branched and/or cyclic. In particular, the aliphatic compound or the aliphatic part of the aliphatic-aromatic compounds may include from 1 to 20, in particular from 1 to 15, preferably from 1 to 10, carbon atoms.

In one preferred embodiment of the present invention, the ligand may be selected from at least dibasic organic acids, in particular dicarboxylic acids, tricarboxylic acids, tetracarboxylic acids, their salts and combinations, more preferably unsubstituted or at least monosubstituted aromatic, in particular mono-, di-, tri-, tetra- or higher-nuclear aromatic, di-, tri- or tetracarboxylic acids. In particular, each of the aromatic nuclei may contain at least one heteroatom, identical or different, in particular N, O, S, B, P, Si and/or Al, preferably N, S and/or O.

It is further preferable for the purposes of the present invention when the ligand is selected from the group of (i) tetradentate carboxylic acids, in particular oxalic acid, malonic acid, succinic acid, glutaric acid, phthalic acid, isophthalic acid, terephthalic acid; (ii) hexadentate carboxylic acids, in particular citric acid, trimesic acid; and (iii) azoles, in particular triazole, pyrrodiazole; their salts and combinations; preferably hexadentate carboxylic acids, more preferably trimesic acid. The employment of trimesic acid is preferable for the purposes of the present invention.

For the purposes of the present invention, the ligand may further be selected from heterocyclic, specifically nitrogenous, aromatic compounds. Similarly, the ligand may be selected from imidazole and/or bipyridine, in particular 2,2'-bipyridine and/or 4,4'-bipyridine.

The spatial structure of the resulting MOF materials is specifically dependent on the geometry, the length and also the number and type of functional groups of the linkers used, and is therefore precisely controllable with regard to the particular application planned for the MOF material.

The MOF material in the activated carbon may further also be in the form of nodes as well as binuclear copper complexes which may more particularly have the shape of a paddlewheel. Without wishing to be tied to this theory, it is believed that the coordination of the paddlewheel copper complexes with di-, tri- or higher functional linkers, such as terephthalate, benzocyclobutanedicarboxylate, naphthalenedicarboxylate, pyrenedicarboxylate, trimesic acid (benzenetricarboxylate, BTC), benzenetribenzoate (BTB) or adamantanetetracarboxylate (ATC), leads to cubic MOF materials in which one carboxylate group of the linker molecule is respectively coordinated with one copper atom of the binuclear copper complex, i.e., in this case there are square $Cu_2(linker)_4$ nodes in the MOF materials. For instance, the MOF material $Cu_3(BTC)_2 \cdot 3H_2O$ is obtainable by linking the binuclear copper complex with BTC linker molecules, whereas the use of the BTB linker leads to the MOF material $Cu_3(BTB)_2$ (also known as MOF-177).

The nodes of the MOF material can also be used as tetrahedral $Zn_4O^{6+}$ clusters whose six edges are connectable by the recited linkers. Without wishing to be tied to this theory, it is believed that the bridging coordination of a carboxylate group of the particular linker with two edges of the $Zn_4O_6$ cluster fixes the orientation of the linker to form an octahedral node of $Zn_4O(linker)_6$. When linkers having two carboxylate functions per linker molecule are used, the linking of two $Zn_4O$ clusters at a time with one linker molecule creates an MOF material having a cubic three-dimensional network with pores, and again the spatial structure depends on the length of the linkers employed. The MOF material consisting of $Zn_4O$ clusters and terephthalate linkers is also denoted as MOF-5.

The use of linkers having various lengths and different types and numbers of functional groups can therefore be used to precisely control the spatial structure of the resulting MOF material in the activated carbon, in particular with regard to the pore size, pore volume and network topology of the MOF material, so the resulting MOF material is custom tailorable for the planned application.

For instance, the MOF material may be present in the pores/porous system of the activated carbon in the form of $Cu_3(BTC)_2$, in particular on proceeding from a copper containing metal precursor (MP) compound, in particular copper nitrate ($Cu(NO_3)_2$), and trimesic acid ($H_3BTC$) as ligand precursor (LP).

The metal-organic framework substance (MOF material) in the porous system of the activated carbon may be at least partly in corpuscular form and/or in particulate form, in particular in crystalline form, preferably in the form of crystallites. In this context, the corpuscles and/or particles, in particular the crystallites, of the metal-organic framework substance (MOF material) should have an average corpuscle and/or particle size, in particular an average crystallite size, in the range from 0.1 nm to 500 nm, in particular in the range from 1 nm to 500 nm, preferably in the range from 2 nm to 400 nm, more preferably in the range from 5 nm to 300 nm, yet more preferably in the range from 10 nm to 200 nm, most preferably in the range from 15 nm to 150 nm. More particularly, the size of the crystallites is controllable/custom tailorable by the occupancy rate of the activated carbon with the metal component and/or with the ligand in the form of the respective precursor compounds and/or in particular by the temperature of the subsequent treatment steps, as defined above. To determine the sizes of the corpuscles/crystallites of the MOF material, methods known per se to a person skilled in the art are employable, such as X-ray diffractometry (XRD) and transmission electron microscopy (TEM).

The metal-organic framework substance (MOF material) should further have a crystallinity, in particular a degree of crystallinity, of at least 10%, in particular at least 30%, preferably at least 50%, more preferably at least 80%, yet more preferably at least 90%, most preferably at least 95%, based on the metal-organic framework substance (MOF material). In particular, the metal-organic framework substance (MOF material) should have a crystallinity, in particular a degree of crystallinity, in the range from 10% to 99.5%, in particular in the range from 30% to 99%, preferably in the range from 50% to 98%, more preferably in the range from 80% to 95%, based on the metal-organic framework substance (MOF material). The high crystallinity of the MOF material further improves efficiency with regard to the decomposition/degradation of noxiant and/or poisonous materials.

It is further preferable in the context of the present invention when the activated carbon includes the metal-organic framework substance (MOF material) in amounts of at least 0.001 wt %, in particular at least 0.01 wt %, preferably at least 0.5 wt %, more preferably at least 1 wt %, yet more preferably at least 2 wt %, based on the total weight of the activated carbon additized with the metal-organic framework substance (MOF material). In addition, the activated carbon should include the metal-organic framework substance (MOF material) in amounts of at most 20 wt %, in particular at most 25 wt %, preferably at most 30 wt %, more preferably at most 35 wt %, yet more preferably at most 40 wt %, based on the total weight of the activated carbon additized with the metal-organic framework substance (MOF material). In particular, the activated carbon should include the metal-organic framework substance (MOF material) in amounts ranging from 0.001 wt % to 40 wt %, in particular from 0.01 wt % to 35 wt %, preferably from 0.5 wt % to 30 wt %, more preferably from 1 wt % to 25 wt %, yet more preferably from 2 wt % to 20 wt %, based on the total weight of the activated carbon additized with the metal-organic framework substance (MOF material).

It may be further provided according to the present invention that the activated carbon has a pore fill fraction $\alpha$ of 0.01 to 0.99, in particular of 0.05 to 0.8, preferably of 0.1 to 0.6, more preferably of 0.15 to 0.5, in relation to the metal-organic framework substance (MOF material). In particular the activated carbon should have a pore fill fraction $\alpha$ of at most 0.99, in particular at most 0.8, preferably at most 0.6, more preferably at most 0.5, in relation to the metal-organic framework substance (MOF material). In this context, the activated carbon should have a pore fill fraction $\alpha$ of at least 0.01, in particular at least 0.05, preferably at least 0.1, more preferably at least 0.15, in relation to the metal-organic framework substance (MOF material). The pore fill fraction $\alpha$ may be calculated according to the formula $[\alpha = V_{MOF}/(V_{pore} \cdot m_{support})]$, in which formula "$V_{MOF}$" is the volume of the metal-organic framework substance (MOF material) in the pores and/or porous system of the activated carbon, "$m_{support}$" is the mass of the activated carbon employed and "$V_{pore}$" is the specific pore volume of the activated carbon.

In this context, a pore fill fraction $\alpha$ of 0.5, for example, means that 50% of the pore volume is filled with the MOF material. Precise establishment of the pore fill fraction $\alpha$ ensures that a certain proportion of the porous system is bare—i.e., not endowed and/or covered with the MOF material—and thus has specifically physisorptive properties.

The activated carbon of the present invention may further be self-supporting and/or in the form of a specifically loose bed.

Alternatively, however, the activated carbon according to the invention may also be applied to a supporting material.

In this context, the supporting material may be gas pervious, in particular air pervious. In this context the supporting material should have a gas perviousness, in particular air perviousness, of at least $10 \; l \cdot m^{-2} \cdot s^{-1}$, in particular at least $30 \; l\{fourth\;root\}m^{-2} \cdot s^{-1}$, preferably at least $50 \; l \cdot m^{-2} \cdot s^{-1}$, more preferably at least $100 \; l \cdot m^{-2} \cdot s^{-1}$, most preferably at least $500 \; l \cdot m^{2} \cdot s^{-1}$, and/or a gas perviousness, in particular air perviousness, of up to $10\,000 \; l \cdot m^{-2} \cdot s^{-1}$, in particular up to $20\,000 \; l \cdot m^{-2} \cdot s^{-1}$, at a flow resistance of 127 Pa.

In a further embodiment of the present invention, the supporting material may have a three-dimensional structure. In particular, the supporting material employed according to the present invention in this embodiment may be a preferably open-cell plastic foam, more preferably polyurethane foam.

In an alternative embodiment, by contrast, the supporting material employed according to the invention may have a two-dimensional/sheetlike structure. More particularly, in this embodiment, the supporting material of this invention may be a preferably textile fabric. For example, the supporting material may be a textile fabric, preferably an air-pervious textile material, more preferably a woven, knitted, laid or bonded textile fabric, in particular a non-woven.

The activated carbon according to the invention may typically be fixed to/on the supporting material. This may be realized for example via adherence (using an adhesive, for example) or as a result of inherent tackiness or adhesiveness on the part of the supporting material in particular.

The present invention further provides—in a third aspect of the present invention—the uses according to the invention of the activated carbon according to the invention with reactive/catalytic additization, in particular as described above, wherein the activated carbon is endowed and/or impregnated with at least one metal-organic framework substance (MOF material).

In particular, the activated carbon according to the present invention is useful in the manufacture of filters and filter materials of any kind, in particular for removing noxiant, odorant and poisonous materials of any kind, in particular from air and/or gas streams, such as NBC protective mask filters, odor filters, sheet filters, air filters, in particular filters for indoor air cleaning, adsorption-capable supporting structures and filters for the medical sector.

The present invention further provides for the use of the activated carbon according to the invention in the manufacture of protective materials of any kind, preferably for NBC deployment, particularly in the manufacture of protective apparel, in particular for the civilian or military sector, such as protective suits, protective gloves, protective footwear, protective socks, protective headgear and the like, and of protective coverings of any kind.

The present invention similarly relates to the use of the activated carbon according to the invention as sorption stores for gases or liquids.

The present invention additionally also provides for the use of the activated carbon according to the invention as catalyst or catalyst carrier.

The present invention further also provides for the use of the activated carbon according to the invention for chemical catalysis.

The present invention additionally provides for the use of the activated carbon according to the invention as gas sensor or in fuel cells.

The present invention again further provides for the use of the activated carbon according to the invention for sorptive, in particular adsorptive, applications, in particular as preferably reactive and/or catalytic adsorbent.

The present invention further also provides for the use of the activated carbon according to the invention for gas cleaning and/or gas purification.

The present invention similarly also provides for the use of the activated carbon according to the invention for the removal of noxiants, in particular gaseous noxiants, or of gases or substances that are toxic, harmful or environmentally damaging.

The present invention finally also provides for the use of the activated carbon according to the invention for reprocessing and/or providing cleanroom atmospheres, in particular for the electronic industry, preferably for semiconductor or chip manufacture.

The present invention in turn further provides—in a fourth aspect of the present invention—protective materials, in particular for the civilian or military sector, preferably for NBC deployment, in particular protective apparel, such as protective suits, protective gloves, protective footwear, protective socks, protective headgear and the like, and also protective coverings, obtained using an activated carbon having reactive and/or catalytic additization as described above, wherein the activated carbon is endowed and/or impregnated with at least one metal-organic framework substance (MOF material), and/or including an activated carbon having reactive and/or catalytic additization as described above, wherein the activated carbon is endowed and/or impregnated with at least one metal-organic framework substance (MOF material).

The present invention additionally further provides—in a fifth aspect of the present invention—filters and filter materials, in particular for removal of noxiant, odorant and poisonous materials of any kind, in particular from air and/or gas streams, such as NBC protective mask filters, odor filters, sheet filters, air filters, in particular filters for indoor air cleaning, adsorption-capable supporting structures and filters for the medical sector, obtained using an activated carbon having reactive and/or catalytic additization as described above, wherein the activated carbon is endowed and/or impregnated with at least one metal-organic framework substance (MOF material), and/or including an activated carbon having reactive and/or catalytic additization as described above, wherein the activated carbon is endowed and/or impregnated with at least one metal-organic framework substance (MOF material).

Further incarnations, elaborations, variations, modifications, special features and advantages of the present invention will become readily apparent to and realizable by the ordinarily skilled in the art on reading the description without their having to depart the realm of the present invention.

The present invention is illustrated by the following exemplary embodiments which, however, shall in no way limit the present invention.

EXEMPLARY EMBODIMENTS

1. Production of Inventive, MOF-Endowed Activated Carbon by Using a Conjoint Solution and/or Dispersion of Precursor Components a) Room Temperature Infiltration To prepare the ground for infiltration with a conjoint solution/dispersion of the respective precursors, 3 g of an activated carbon/substrate having a porous volume of about 2.42 cm$^3$ g$^{-1}$ are placed in a round-bottom flask cooled in an ice bath. A magnetic stirbar is used to commix the substrate. To prepare the precursor solution (conjoint solution of metal precursor (MP) compound and of ligand precursor (LP)) 0.250 g of trimesic acid are dissolved in 6 ml of an 80:20 ethanol-water mixture and 0.9 g of copper nitrate trihydrate are dissolved in 2.1 ml of an 80:20 ethanol-water mixture. The solutions are mixed at room temperature (T=20° C.) and the precursor solution thus formed is then added directly dropwise to the substrate. The sample is then dried at room temperature for about 10 min in a dynamic vacuum (<50 mbar), then aftertreated/conditioned (in a screw-top vessel not fully closed) at 70° C. for about 20 hours and finally Soxhleted with ethanol. After drying and/or further aftertreatment in an open vessel in a drying cabinet (at 90° C. for 12 hours), 1.05 g of product were recovered in the form of an inventive, MOF-endowed activated carbon A1.

b) Low Temperature Infiltration

To prepare the ground for infiltration with one precursor solution containing not only the metal precursor (MP) compound but also the ligand precursor (LP), 3 g of an activated carbon/substrate having a porous volume of about 2.42 cm$^3$ g$^{-1}$ are placed as substrate in a round-bottom flask cooled in an ice bath. A magnetic stirbar is used to commix the substrate. To prepare the precursor solution, 0.525 g of trimesic acid and 1.81 g of copper nitrate trihydrate are dissolved in 6 ml of ethanol and 2.1 ml of ethanol, respectively. The solutions are cooled down to about −40° C. and mixed and the resultant precursor solution (conjoint solution of metal precursor (MP) compound and of ligand precursor (LP)) is added dropwise to the substrate. The sample is then dried at room temperature for about 10 min in a dynamic vacuum (<50 mbar), then aftertreated/conditioned (in a screw-top vessel not fully closed) at 70° C. for about 20 hours and finally cleaned/Soxhleted with ethanol. After drying and/or further aftertreatment in an open vessel in a drying cabinet (at 90° C. for 12 hours), 1.2 g of product are recovered in the form of an inventive, activated carbon A2. Some of the activated carbon A2 thus obtained is subjected to a subsequent heat/activation treatment at 200° C. under ambient atmosphere for 24 hours (inventive activated carbon A2').

2. Production of Inventive, MOF-Endowed Activated Carbon by Two-Step Infiltration with Individual Components a) Example 1

To prepare the ground for infiltration, 3 g of an activated carbon substrate having a porous volume of about 2.42 cm$^3$ g$^{-1}$ are placed in a round-bottom flask cooled in an ice bath. A magnetic stirbar is used to commix the substrate. Then, 0.525 g of trimesic acid dissolved in 6.9 ml of ethanol is added dropwise. This is followed by an intervening drying operation at 50° C. in vacuo (<50 mbar) for about 1 hour and, after renewed cooling of the substrate, by the infiltration with 1.81 g of copper nitrate trihydrate dissolved in 4.5 ml of ethanol. The sample is then predried at room temperature in a dynamic vacuum (<50 mbar) for about 10 min, then thermally aftertreated/conditioned at 70° C. for about 20 hours and finally Soxhleted with ethanol. After drying and/or further aftertreatment in an open vessel in a drying cabinet (at 90° C. for 12 hours), about 1.4 g of product are recovered in the form of inventive activated carbon A3.

a) Example 2

To prepare the ground for infiltration, 10 g each of the above-defined activated carbon substrate are placed in a round-bottom flask cooled in an ice bath. A magnetic stirbar is used to commix the substrate. To infiltrate with trimesic acid, an ethanolic solution having a concentration of 88 g/l is used (see table 1 for volumes employed). This is followed by an intervening drying operation at 50° C. in vacuo (<50 mbar) for about 1 hour and, following renewed cooling of the substrate, by infiltration with corresponding volumes of ethanolic copper nitrate trihydrate solutions having a concentration of 402 g/l. The sample is then predried at room temperature in a dynamic vacuum (<50 mbar) for about 10 min, then thermally aftertreated/conditioned at 70° C. for 48 hours and finally washed/Soxhleted with ethanol. After drying and/or further aftertreatment in an open vessel in a vacuum drying cabinet (at 80° C. for 24 hours), the products reported in table 1 are obtained in the form of inventive activated carbons A4 to A7.

TABLE 1

Process parameters of inventive activated carbons A4 to A7

| Activated carbon | Porous volume (cm$^3$/g) | V(H3BTC sol.) (ml) | V(Cu(NO$_3$)$_2$ sol.) (ml) | Final weight (g) |
| --- | --- | --- | --- | --- |
| A4 | 0.81 | 8 | 6 | 12.63 |
| A5 | 0.93 | 9 | 6.8 | 12.587 |
| A6 | 1.1 | 11 | 8.3 | 13.032 |
| A7 | 1.21 | 12 | 9.1 | 13.64 | c) Example 3

To prepare the ground for infiltration, 500 g each of an activated carbon substrate having a porous volume of about 0.91 cm$^3$/g are placed in a round-bottom flask cooled in an ice bath. An external rotating mechanical propeller stirrer is used to commix the substrate. The infiltration with trimesic acid is effected using 300 ml of an 80:20 ethanol-water mixture having a concentration of 110 g/l. This is followed immediately thereafter by infiltration with 90 ml of aqueous copper nitrate trihydrate solution having a concentration of 1233 g/l. A 20 l (loose bed) volume of the infiltrated activated carbon obtained in this way is apportioned to four vessels and then thermally aftertreated/conditioned at 80° C. overnight during which NO$_2$ is released. The samples are subsequently stored/further aftertreated at room temperature for 3.5 weeks. By way of washing, 10 l at a time of the infiltrated samples are repeatedly stirred/slurried up with about 10 l of distilled water for 1 to 2 min, and the wash liquor is subsequently decanted off. This operation is repeated until there is no longer any significant bluing/cloudiness observable in the wash liquor. This is followed by a twofold wash with about 5 l of ethanol each time, carried out in a similar manner. The samples are subsequently dried in an air stream and finally dried at 120° C. in a vacuum drying cabinet in a dynamic vacuum (<50 to 250 mbar) to give an inventive activated carbon A8.

d) Example 4

To prepare the ground for infiltration with a copper source, 1250 g of activated carbon substrate having a porous volume of about 0.8 cm$^3$/g are initially charged and infiltrated with a solution of 270 g of basic copper carbonate and 280 g of ammonium carbonate in a mixture of 1217 ml of 32% ammonia solution and 662 ml of water. This is followed by a heat treatment or drying of the sample in air at 120° C. 50 g of this preimpregnated activated carbon (having an expected copper content of 5.95 g) are subsequently infiltrated with 188 ml of a trimesic acid solution having a concentration of 100 g/l in an 80:20 ethanol-water mixture in a rotary evaporator and then subjected to a heat treatment at 80° C. in a drying cabinet for 48 hours to obtain an inventive activated carbon A9.

e) Example 5

To prepare the ground for infiltration with the copper source, 1250 g of activated carbon substrate, as recited under Example 4, are initially charged and infiltrated with a solution of 270 g of basic copper carbonate and 280 g of ammonium carbonate in a mixture of 1217 ml of 32% ammonia solution and 662 ml of water. This is followed by a heat treatment or drying in air at 250° C. 50 g of the preimpregnated activated carbon (having an expected copper content of 6.7 g) are subsequently infiltrated with 188 ml of a trimesic acid solution having a concentration of 100 g/l in an 80:20 ethanol-water mixture and then conditioned at 80° C. in a drying cabinet for 48 hours to obtain an inventive activated carbon A10.

3. Measured Results and Characterization of Inventive Activated Carbons

As part of a comparative analysis, the activated carbons in question are subjected to a breakthrough measurement in respect of the substances cyclohexane ($C_6H_{12}$), ammonia ($NH_3$) and hydrogen sulfide ($H_2S$).

The conditions for the breakthrough measurements are similar to the ABEK1 requirements. In this context, an adsorption bed having a diameter of 7.2 mm and a height of 21 mm is used. The inflow speed is 0.1 m/s. An ingoing concentration of 1000 ppm of cyclohexane, $NH_3$ and/or $H_2S$ is established at a temperature of 20° C. and a relative humidity of 70% rh. The breakthrough concentrations are 10 ppm for cyclohexane, 25 ppm for $NH_3$ and 10 ppm for $H_2S$.

Table 2 hereinbelow shows the respective results.

TABLE 2

Measured results/characterization of inventive activated carbons

| Activated carbon | $C_6H_{12}$ (minutes) | $NH_3$ (minutes) | $H_2S$ (minutes) |
|---|---|---|---|
| A1 | 30 | 20 | 19 |
| A2 | 38 | 29 | 31 |
| A2' | 45 | 34 | 38 |
| A3 | 18 | 39 | 44 |
| A4 | 86 | 29 | 40 |
| A5 | 98 | 18 | 54 |
| A6 | 104 | 19 | 59 |
| A7 | 57 | 53 | 44 |
| A8 | 62 | 36 | 40 |
| A9 | 68 | 20 | 29 |
| A10 | 62 | 21 | 19 |

The values reported in table 2 attest to the excellent adsorption properties of inventive activated carbons for both organic and inorganic compounds in that said activated carbons according to the invention display altogether a high degree of broadbandedness in respect of their adsorption behavior, entailing long breakthrough times for the particular organic and/or inorganic substances to be adsorbed.

4. Investigations on Comparative Activated Carbons without MOF in Porous System

The corresponding adsorbents used for comparison are, firstly, an untreated activated carbon as such having a porous volume of about 2.42 cm$^3$/g (activated carbon B1), an activated carbon endowed with copper oxide and similarly having a porous volume of about 2.42 cm$^3$/g (activated carbon B2) and also a mixture of an untreated activated carbon as per B1 with a particulate MOF material (mixing ratio 50:50) based on a copper component and trimesic acid (comparative material B3). In this context, the breakthrough behavior is determined for cyclohexane, ammonia and hydrogen sulfide as per the aforementioned conditions. Table 3 hereinbelow shows the results obtained in this regard:

TABLE 3

Measured results/characterization of comparative materials

| Activated carbon | $C_6H_{12}$ (minutes) | $NH_3$ (minutes) | $H_2S$ (minutes) |
|---|---|---|---|
| B1 | 28 | 5 | 2 |
| B2 | 21 | 12 | 15 |
| B3 | 20 | 17 | 18 |

Table 3 shows that the corresponding comparative materials have altogether significantly worse breakthrough properties in respect of the reported substances. What is more, high dusting and/or disintegration of the MOF particles under mechanical stress is observed for the material as per B3.

The aforementioned investigations thus attest altogether to the excellent properties of the inventive activated carbons featuring the precise endowment of the porous system with an MOF material prepared, as noted, in situ in the porous system of the activated carbon.

The work leading to this invention was sponsored by the Seventh Framework Program of the European Union ([FP7/2007-2013] [FP7/2007-2011]) under Grant Agreement Number 228604.

What is claimed is:

1. A process for producing an activated carbon in the form of discrete particles of activated carbon comprising a porous system with a multitude of pores, which activated carbon is provided with catalytic properties via impregnation of the activated carbon particles with at least one metal-organic framework substance (MOF material);
   wherein the metal-organic framework substance is produced in situ in the pores of the activated carbon from at least one metal precursor (MP) compound, which comprises at least one metal, and from at least one ligand precursor (LP),
   wherein the metal precursor (MP) compound and the ligand precursor (LP) are introduced into the pores of the activated carbon, wherein the metal precursor (MP) compound and ligand precursor (LP) are each used, conjointly or separately from each other, in the form of at least one aqueous, aqueous-alcoholic or alcoholic solution or dispersion, wherein introducing the metal precursor (MP) compound and the ligand precursor (LP), conjointly or separately from each other, into the pores the activated carbon is effected by a step of impregnating the activated carbon with the at least one solution or dispersion of the metal precursor (MP) compound and of the ligand precursor (LP), wherein introducing the metal precursor (MP) compound and the ligand precursor (LP) is followed by at least a step of drying the activated carbon until the solvent or dispersant is at least essentially completely removed from the pores of the activated carbon, wherein the drying is carried out at temperatures in the range from 0° C. to 50° C., wherein the steps of introducing the metal precursor (MP) compound and the ligand precursor (LP) and of drying the activated carbon are followed by at least one thermal post-treatment to convert the metal precursor (MP) compound together with the ligand precursor (LP) into a metal-organic framework substance (MOF-material), wherein the thermal post-treatment is carried out at a temperature in the range from 50° C. to 500° C., and wherein the metal-organic framework substance (MOF material) is present in crystalline form, wherein the particles of the metal-organic framework substance (MOF material) have an average particle size in the range from 0.1 nm to 500 nm.

2. The process as claimed in claim 1 wherein the metal, in particular metal atom, of the metal precursor (MP) compound is selected from the group of Mg, Ca, Sr, Ba, Sc, Y, Ti, Zr, Hf, V, Nb, Ta, Cr, Mo, W, Mn, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, Sb and Bi, preferably selected from the group of Zn, Cu, Ni, Pd, Pt, Ru, Fe, Mn, Ag, Al and Co, preferably selected from the group of Cu, Fe, Co, Zn, Mn, Al and Ag, more preferably selected from the group of Cu, Fe, Al and Zn.

3. The process as claimed in claim 1, wherein the ligand precursor (LP) is employed in the form of an at least bidentate or bridging organic ligand precursor (LP).

4. The process as claimed in claim 1, wherein the ligand precursor (LP) includes at least one functional group capable of forming, in respect of one metal, wherein the functional group of the ligand precursor (LP) includes at least one heteroatom from the group consisting of N, O, S, B, P, Si and Al.

5. The process as claimed in claim 1, wherein the ligand precursor (LP) is selected from at least dibasic organic acids, dicarboxylic acids, tricarboxylic acids, tetracarboxylic acids, their salts and combinations, comprising each at least one heteroatom, identical or different, from the group consisting of N, O, S, B, P, Si and Al.

6. The process as claimed in claim 1, wherein the activated carbon is formed from granular or spherical activated carbon having particle sizes in the range from 0.001 mm to 3 mm.

7. The process as claimed in claim 1, wherein the activated carbon has a specific BET surface area in the range from 500 $m^2/g$ to 4000 $m^2/g$ and a Gurvich total pore volume in the range from 0.50 $cm^3/g$ to 2.0 $cm^3/g$.

8. The process as claimed in claim 1, wherein the activated carbon has a bursting pressure of at least 5 newtons per particle.

9. The process as claimed in claim 1, wherein the activated carbon has an adsorption volume $V_{ads}$ in the range from 250 $cm^3/g$ to 3000 $cm^3/g$ and a total porosity in the range from 10% to 80%, based on the particle volume of the activated carbon.

10. The process as claimed in claim 1, wherein the step of drying is effected under reduced pressure and at temperatures in the range from 5° C. to 40° C., and wherein the thermal post-treatment is carried out at a temperature in the range from 50° C. to 400° C.

11. The process as claimed in claim 1, wherein a further step of activating the metal-organic framework substance (MOF material) is carried out.

12. The process as claimed in claim 11, wherein the further step of activating the metal-organic framework substance (MOF material) is carried out by subjecting the activated carbon provided with the metal-organic framework substance (MOF material) to a heat activation treatment at temperatures in the range from 90° C. to 300° C. under an at least essentially nonreactive or oxidizing atmosphere.

13. The process as claimed in claim 1, wherein the metal precursor (MP) compound and the ligand precursor (LP) are employed in the form of a conjoint solution or dispersion comprising the metal precursor (MP) compound and the ligand precursor (LP), wherein the solution or dispersion comprising the metal precursor (MP) compound and the ligand precursor (LP) is obtained by mixing a first solution or dispersion comprising the metal precursor (MP) compound and a second solution or dispersion comprising the ligand precursor (LP).

14. The process as claimed in claim 1, wherein the metal precursor (MP) compound and the ligand precursor (LP) are employed in the form of separate solutions or dispersions, wherein introducing the metal precursor (MP) compound and the ligand precursor (LP) into the pores of the activated carbon is effected by successively impregnating the activated carbon with the separate solutions or dispersions of the metal precursor (MP) compound on the one hand and of the ligand precursor (LP) on the other hand.

15. An activated carbon in the form of discrete particles of activated carbon comprising a porous system with a multitude of pores, which activated carbon is provided with catalytic properties via impregnation of the activated carbon particles with at least one metal-organic framework substance (MOF material), wherein the metal-organic framework substance (MOF material) is present in crystalline form, wherein the particles of the metal-organic framework substance (MOF material) have an average particle size in the range from 0.1 nm to 500 nm.

16. The activated carbon as claimed in claim 15, wherein the activated carbon is obtained by producing the metal-organic framework substance (MOF material) in situ in the pores of the activated carbon from at least one metal precursor (MP) compound, which comprises at least one metal, and at least one ligand precursor (LP).

17. The activated carbon as claimed in claim 15, wherein the activated carbon is obtained by a process as claimed in claim 1.

18. The activated carbon as claimed in claim 15, wherein the metal-organic framework substance (MOF material) has a crystallinity in the range from 10% to 99.5%, based on the metal-organic framework substance (MOF material), and wherein the activated carbon comprises the metal-organic framework substance (MOF material) in amounts ranging from 0.001 wt % up to 40 wt %, based on the total weight of the activated carbon provided with the metal-organic framework substance (MOF material).

19. The activated carbon as claimed in claim 15, wherein the activated carbon has a pore fill fraction $\alpha$ of from 0.01 to 0.99, in relation to the metal-organic framework substance (MOF material), wherein the pore fill fraction $\alpha$ is calculated according to the formula $[\alpha = V_{MOF}/(V_{pore} \cdot m_{support})]$, in which formula "$V_{MOF}$" is the volume of the metal-organic framework substance (MOF material) in the pores of the activated carbon, "$m_{support}$" is the mass of the activated carbon employed and "$V_{pore}$" is the specific pore volume of the activated carbon.

20. A protective material for the civilian or military sector, the protective material being selected from the group consisting of protective apparel, protective suits, protective gloves, protective footwear, protective socks, protective headgear and protective coverings and the protective material comprising an activated carbon as claimed in claim 15.

21. A filter material for removal of noxiant, odorant and poisonous materials from air or gas streams, the filter material being selected from the group consisting of NBC protective mask filters, odor filters, sheet filters, air filters, filters for indoor air cleaning, adsorption-capable supporting structures and filters for the medical sector and the filter material comprising an activated carbon as claimed in claim 15.

* * * * *